United States Patent Office 3,428,623
Patented Feb. 18, 1969

---

3,428,623
COUMARIN DERIVATIVES
John G. Keil, Manlius, and Irving R. Hooper, Fayetteville, N.Y., assignors to Bristol-Myers Company, New York, N.Y., a corporation of Delaware
No Drawing. Continuation-in-part of application Ser. No. 583,984, Oct. 3, 1966. This application Nov. 2, 1966, Ser. No. 591,451
U.S. Cl. 260—210                                19 Claims
Int. Cl. C07g *3/00;* C12k *1/00;* A61k *21/00*

ABSTRACT OF THE DISCLOSURE

The cleavage of the antibiotic substances coumermycin $A_1$ and $A_2$ with an acylating agent of the benzoic acid series produces new benzoyl derivatives of the parent coumermycin that possess potent antibacterial activity.

The compounds and the process as practiced herein are typified by the reaction of ditetrahydropyranylcoumermycin $A_1$ with benzoyl chloride to produce N-benzoyl-3-amino-4-hydroxy-8-methyl-7-[3-0-(5-methyl-2-pyrrolylcarbonyl)novisoyloxy]coumarin.

---

Cross-references to related applications

This application is a continuation-in-part of our prior co-pending application for Letters Patent entitled "Antibacterial Agents," Ser. No. 583,984, filed Oct. 3, 1966, now abandoned.

Background of the invention

Field of the invention.—Coumermycin $A_1$ is an effective antibacterial agent but is disadvantaged by its poor absorption and resultant low blood levels. Efforts to correct this deficiency have resulted in the new N-benzoyl cleavage products of the parent coumermycin.

Description of the prior art.—The compounds of the present invention and the process for their preparation are new and novel. Few examples are available whereby an antibiotic substance can be so drastically modified and yet retain its activity.

Summary of the invention

Compounds having the formulae

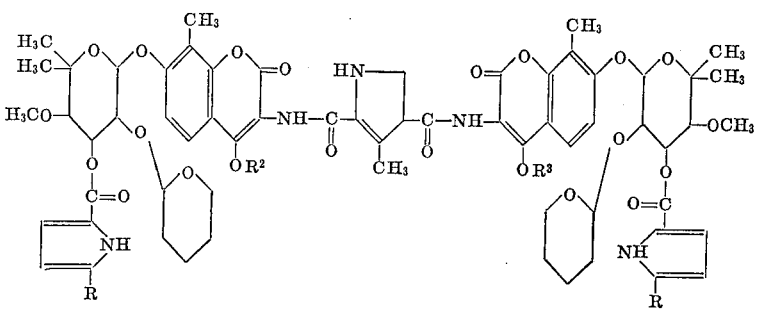

wherein R is hydrogen or methyl, and $R^2$ and $R^3$ are the same or different and are either —H or

are mixed with an acid halide having the formula

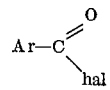

or its functional equivalent as an acylating agent in which Ar is a group having the formula

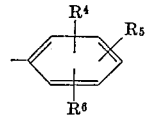

in which $R^4$, $R^5$ and $R^6$ each represent hydrogen, fluoro, chloro, bromo, iodo, trifluoromethyl, trichloromethyl, di-(lower)alkylamino, nitro, cyano, acetoxy, (lower)alkyl, (lower)alkenyl, (lower)alkynyl, (lower)alkoxy, N,N-di-(lower)alkylcarboxamido, thioacetoxy, carb(lower)alkoxy or (lower)alkylthio; to produce a compound having the formula

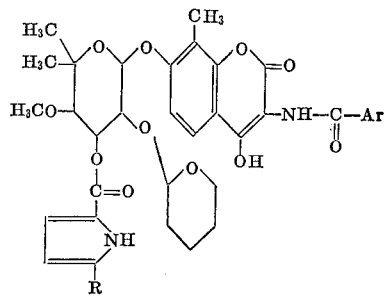

wherein R and Ar are as described above; and allowing said tetrahydropyranyl ether to stand in a polar solvent in the presence of a catalytic amount of an acid to cleave off the tetrahydropyranyl group.

Detailed description

This invention relates to antibacterial agents which are derivatives of the antibiotic substances coumermycin $A_1$ and coumermycin $A_2$ (U.S. Patent 3,201,386) and to processes for their production. More particularly it relates to products resulting from the acylative cleavage of the tetrahydropyranyl ethers of coumermycins $A_1$ and $A_2$ and to the process of preparing same by the reaction of an acylating agent of the benzoic acid series with said tetrahydropyranyl (THP) derivatives.

Coumermycin $A_1$ (R is methyl) and coumermycin $A_2$ (R is hydrogen)

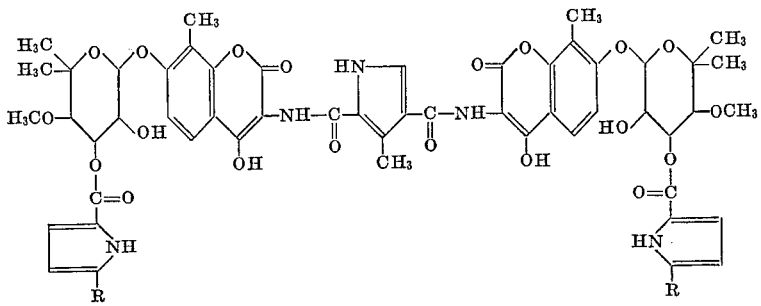

are effective in inhibiting the growth of gram-positive bacteria. Both are nontoxic and exhibit a therapeutic effect on mice infected with gram-positive bacteria. A major disadvantage of the coumermycins however is their poor absorption and resultant low blood levels. Efforts to correct these deficiencies have resulted according to the present invention, in new and novel N-benzoyl cleavage products of the parent coumermycins, said compounds being antibacterial agents active against Staphylococcus aureus Smith.

These objectives were obtained by the provision, according to the present invention, of the compounds having the formula

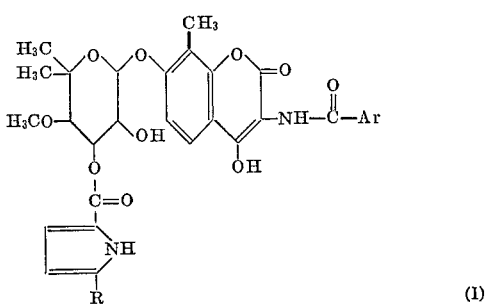

(I)

wherein R is either hydrogen or methyl, and Ar is a group having the formula

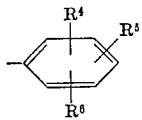

in which each of $R^4$, $R^5$ and $R^6$ represents hydrogen, fluoro, chloro, bromo, iodo, trifluoromethyl, trichloromethyl, amino, N-(lower)alkylamino, N,N-di(lower)alkylamino, nitro, cyano, (lower)alkyl, (lower)alkenyl, (lower)alkynyl, (lower)alkoxy, hydroxy, carboxamido, N-(lower)alkylcarboxamido, N,N-di(lower)alkylcarboxamido, carboxy, carb(lower)alkoxy, acetoxy, mercapto, thioacetoxy or (lower)alkylthio; and the nontoxic, pharmaceutically acceptable cationic salts thereof.

A more limited and preferred embodiment of the present invention comprises the compounds having the Formula I, wherein R is either hydrogen or methyl, and Ar is a group having the formula

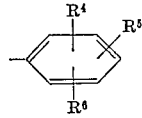

in which each of $R^4$, $R^5$ and $R^6$ represents hydrogen, fluoro, chloro, bromo, iodo, trifluoromethyl, amino, N,N-di(lower)alkylamino, nitro, cyano, (lower)alkyl, (lower)alkenyl, (lower)alkynyl, (lower)alkoxy, hydroxy, carboxy, carb(lower)alkoxy, acetoxy, mercapto, thioacetoxy or (lower)alkylthio; and the nontoxic pharmaceutically acceptable cationic salts thereof.

A further limited and preferred embodiment of the present invention comprises the compounds having the Formula I, wherein R is either hydrogen or methyl, and Ar is a group having the formula

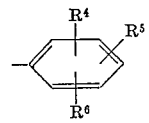

in which each of $R^4$, $R^5$ and $R^6$ represents hydrogen, fluoro, chloro, bromo, iodo, trifluoromethyl, N,N-di(lower)alkylamino, nitro, cyano, (lower)alkyl, (lower)alkenyl, (lower)alkynyl, (lower)alkoxy, N,N-di(lower)alkylcarboxamido, carb(lower)alkoxy, acetoxy, thioacetoxy or (lower)alkylthio; and the nontoxic, pharmaceutically acceptable cationic salts thereof.

A particularly preferred embodiment of the present invention is the group of compounds having the Formula I wherein R is either hydrogen or methyl, and Ar is a group having the formula

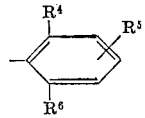

in which each of $R^4$, $R^5$ and $R^6$ represents hydrogen, fluoro, chloro, bromo, iodo, trifluoromethyl, amino, N,N-di(lower)alkylamino, nitro, cyano, (lower)alkyl, (lower)alkenyl, (lower)alkynyl, (lower)alkoxy, hydroxy, carboxy, carb(lower)alkoxy, acetoxy, mercapto, thioacetoxy or (lower)alkylthio; and wherein no more than one of the group $R^4$, $R^5$ and $R^6$ shall be hydrogen; and the nontoxic, pharmaceutically acceptable cationic salts thereof.

Another preferred group of compounds within the scope of the present invention comprises the compounds having the Formula I, wherein R is either hydrogen or methyl, and Ar is a group having the formula

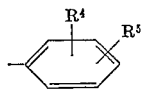

in which each of $R^4$ and $R^5$ represents hydrogen, fluoro, chloro, bromo, iodo, trifluoromethyl, amino, N,N-di(lower)alkylamino, nitro, cyano, (lower)alkyl, (lower)alkenyl, (lower)alkynyl, (lower)alkoxy, hydroxy, mercapto, carboxy, carb(lower)alkoxy, acetoxy, thioacetoxy, or (lower)alkylthio and the nontoxic, pharmaceutically acceptable cationic salts thereof.

The term "(lower)alkyl" as used herein means both straight and branched chain aliphatic hydrocarbon radicals having from one to eight carbon atoms such as methyl, ethyl, propyl, isopropyl, butyl, isobutyl, t-butyl, amyl, hexyl, etc. Where the term "(lower)" is used as part of the description of another group, e.g., "(lower)alkoxy," it refers to the alkyl portion of such group which is therefore as described above in connection with "(lower)alkyl" and thus includes such radicals as methoxy, ethoxy, isopropoxy, etc. The term "(lower)alkenyl" as used herein means both straight and branched chain unsaturated hydrocarbon radicals of the formula $$-(C_nH_{2n-1})$$

wherein $n$ is a whole integer of 2 to 8, i.e., $$-CH_2-CH=C(CH_3)_2$$

$-CH=CH_2$, etc. Similarly, the term "(lower)alkynyl" as used herein means both straight and branched chain unsaturated hydrocarbon radicals of the formula $$-(C_nH_{2n-3})$$

wherein $n$ is a whole integer of 2 to 8, i.e., $$-CH_2-C\equiv C-CH_3$$

$-C\equiv C-CH(CH_3)_2$, etc.

Also included within the scope of the present invention is the process which comprises the consecutive steps of mixing together a compound having the formula

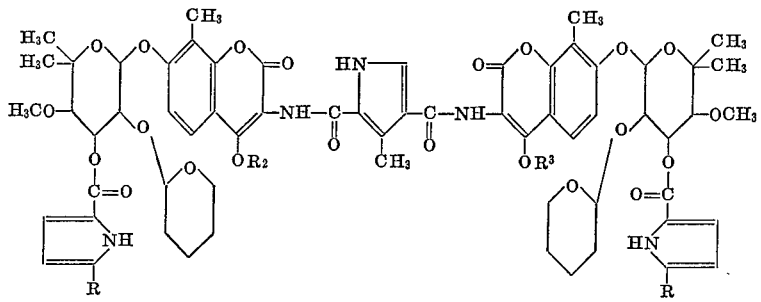

wherein R is hydrogen or methyl, and $R^2$ and $R^3$ are the same or different and are either —H or

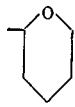

with an acid halide having the formula

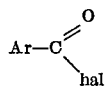

or its functional equivalent as an acylating agent in which Ar is a group having the formula

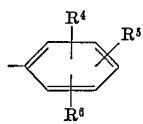

in which $R^4$, $R^5$ and $R^6$ each represent hydrogen, fluoro, chloro, bromo, iodo, trifluoromethyl, trichloromethyl, di(lower)alkylamino, nitro, cyano, acetoxy, (lower)alkyl, (lower)alkenyl, (lower)alkynyl, (lower)alkoxy, N,N-di(lower)alkylcarboxamido, thioacetoxy, carb(lower)alkoxy or (lower)alkylthio; to produce a compound having the formula

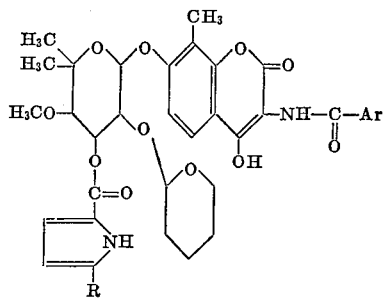

(II)

wherein R and Ar are as described above; and allowing said tetrahydropyranyl ether to stand in a polar solvent in the presence of a catalytic amount of an acid to produce a compound having the Formula I.

Thus, mixing together a 2′,2′,4,4,O,O,O,O-tetratetrahydropyranylcoumermycin, or a 2′,2′-4-O,O,O-tritetrahydropyranylcoumermycin or a 2′,2′-O,O-ditetrahydropyranylcoumermycin, or mixtures thereof, an excess of an unsubstituted or substituted benzoyl halide or benzoic acid anhydride, or their functional equivalents as acylating agents for the production of N-mono-substituted amides, in a proton accepting solvent for several hours at about room temperature or at elevated temperatures produces a compound having the Formula II wherein R and Ar are as described above in Formula II, and subsequently allowing the above Compound II to stand in a polar solvent, such as an alcohol, in the presence of a catalytic amount of an acid cleaves the tetrahydropyranyl ether linkage to produce a compound having the Formula I.

Compounds having the Formula I possess potent antibacterial activity, e.g., against *Staphylococcus aureus*. They are well absorbed and produce good blood levels upon oral or parenteral administration to mammals.

The compounds prepared by the process described above are readily modified into compounds containing moieties other than those attached to the benzene ring of the Ar group referred to above in Formula I. Said compounds are also considered an integral part of the instant invention.

When compounds having Formula I contain a nitro, cyano, acetoxy, thioacetoxy

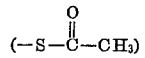

or carb(lower)alkoxy function in the Ar group, it is possible to change the above functions to a new species.

Mild hydrolysis of the acetoxy, thioacetoxy and carb(lower)alkoxy functions will produce Ar groups containing hydroxy, mercapto and carboxy functions respectively. Similarly reduction of a nitro function will produce an Ar group containing an amino function.

Amination of the resultant carboxy function above may produce N-substituted or unsubstituted carboxamido functions on the Ar group. N-alkylation of the amino function above may produce N-(lower)alkylamino or N,N-di(lower)alkylamino functions on the Ar group.

The compounds of the instant invention having the general Formula I all possess an acidic hydroxyl function at the 4 position of the coumarin moiety. The acidic nature of the hydroxyl allows one to readily prepare nontoxic pharmaceutically acceptable, cationic salts of the compounds having the Formula I, e.g., sodium, potassium, calcium, aluminum and ammonium salts and their nontoxic substituted ammonium salts with an amine selected from the group consisting of trialkylamines, procaine, dibenzylamine, N-benzyl-beta-phenethylamine, 1-ephenamine, N,N′-dibenzylethylenediamine, dehydroabietylamine, N,N′-bis-dehydroabietyl-ethylenediamine and N-(lower)alkylpiperidines, e.g., N-ethylpiperidine.

Furthermore, when desired for specific purposes and rendered pharmaceutically compatible, there may be admixed with a member of the present invention various other additional medicaments, such as antihistamines, sulfa drugs, (e.g., sulfadiazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N'-3,4-dimethylbenzoylsulfanilamide, benzylsulfanilamide and N'-2-(2-quinoxalyl)sulfanilamide), stimulants of the central nervous system (e.g., caffeine, amphetamines), local anesthetics, analgesics (e.g., aspirin, salicylamide, sodium gentisate, p-acetylaminophenol, phenacetin, codeine), laxatives (e.g., phenolphthalein), sedatives (e.g., barbiturates, bromides), salts of penicillin (e.g., potassium penicillin G, procaine penicillin G, 1-ephenamine penicillin G, dibenzylamine penicillin G, other salts disclosed by U.S. Patent 2,627,491; these combinations are particularly useful to enable variation of the pattern of blood levels obtained), phenoxymethylpenicillin and salts thereof, other antibiotic agents (e.g., streptomycin, dihydrostreptomycin, bacitracin, polymixin, tetracycline, erythromycin, chlortetracycline, oxytetracycline, oleandomycin, chloramphenicol, magnamycin, novobiocin, cycloserine; in some cases such combinations attack a wider range of organisms or show synergistic efficacy or provide decreased toxicity with equal efficacy), vitamins (e.g., vitamins A, $A_1$, $B_1$, $B_2$, $B_6$, $B_{12}$ and members of that family, folic acid and members of that family, vitamins C, $D_2$, $D_3$ and E), hormones (e.g., cortisone, hydrocortisone, 9α-fluorocortisone, 9α-fluorohydrocortisone, prednisone and prednisolone), anabolic agents (e.g., 11,17-dihydroxy-9α-fluoro-17α-methyl-4-and-rosten-3-one; 17α - ethyl-19-nortestosterone) and antifungal agents (e.g., mycostatin).

The objectives of the present invention have been achieved, by the provision according to the present invention, of the process for the synthesis of compounds having the formula

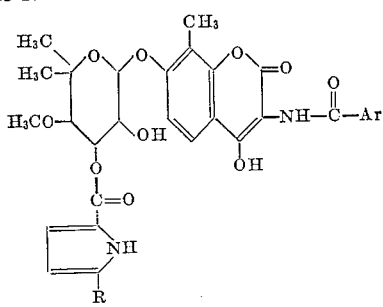

wherein R is either hydrogen or methyl, and Ar is a group having the formula

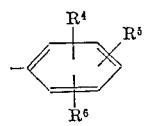

in which each of $R^4$, $R^5$ and $R^6$ represents hydrogen, fluoro, chloro, bromo, iodo, trifluoromethyl, trichloromethyl, thioacetoxy, N,N-di(lower)alkylamino, carb(lower)alkoxy, nitro, cyano, (lower)alkyl, (lower)alkenyl, (lower)alkynyl, (lower)alkylthio, (lower)alkoxy, acetoxy or N,N-di(lower)alkylcarboxamido; which comprises the consecutive steps of (a) mixing together a compound having the formula

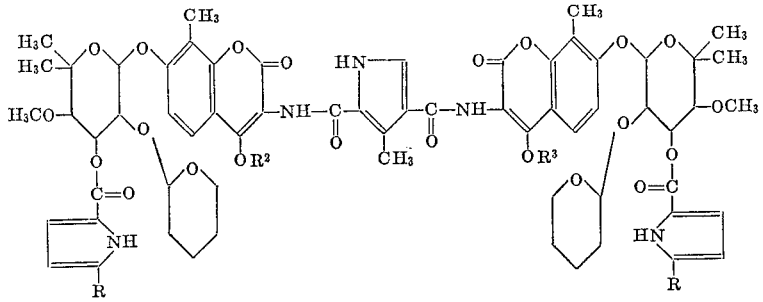

wherein R is hydrogen or methyl, and $R^2$ and $R^3$ are the same or different and are either —H or

with an acid halide having the formula

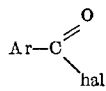

or its functional equivalent as an acylating agent, functional equivalent being more specifically defined as a compound having the formula

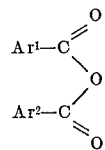

or

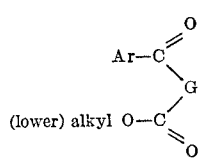

in which $Ar^1$ and $Ar^2$ are alike and are the same as Ar, Ar being a group having the formula

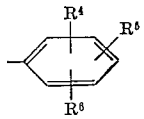

in which $R^4$, $R^5$ and $R^6$ each represent hydrogen, fluoro, chloro, bromo, iodo, trifluoromethyl, trichloromethyl, N,N-di(lower)alkylamino, nitro, cyano, (lower)alkyl, (lower)alkenyl, (lower)alkynyl, (lower)alkoxy, acetoxy, N,N-di(lower)alkylcarboxamido, —S—$COCH_3$, (lower) alkylthio or carb(lower)alkoxy, in a homogeneous or heterogeneous system capable of inactivating protons, said system comprising an inorganic or organic base selected from the group consisting of an alkali carbonate or bicarbonate, alkali earth metal carbonate or bicarbonate, a pyridine or a tri(lower)alkylamine, alone or in combination with an inert solvent selected from the group consisting of tetrahydrofuran, benzene, toluene, xylene, ether, chloroform, etc., but preferably in a solvent system comprising a pyridine or a tri(lower)alkylamine alone or in combination with an inert solvent, at a temperature in the range of −20° C. to 150° C., but preferably in the range of −5° C. up to the boiling point of the solvent system used, to produce a compound having the formula

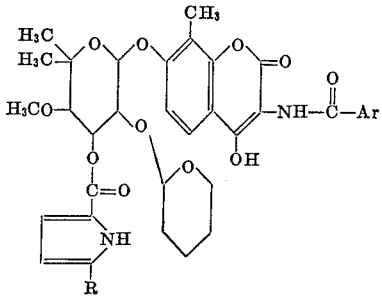

wherein R and Ar are as described above; and (b) allowing said tetrahydropyranyl ether to stand, preferably in homogeneous solution, in a (lower)alkanol solvent, i.e., methanol, ethanol, etc., or in a cosolvent system containing an alcohol, with or without the aid of heat, but preferably at a temperature in the range of 0° C. up to the boiling point of the solvent system used, in the presence of a catalytic amount of an acid selected from the group consisting of mineral acids, arylsulfonic acids, Lewis acids, acid resins, activated carboxylic acids, or alkylsulfonic acids, but preferably arylsulfonic acids, to produce a compound of the present invention having the formula

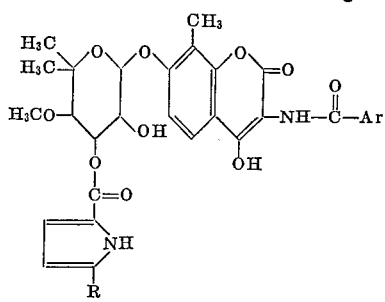

wherein R and Ar are as described above.

amido, carboxy, carb(lower)alkoxy, acetoxy, mercapto, thioacetoxy or (lower)alkylthio.

In the preferred embodiments of the present invention R is as defined above and is especially methyl, Ar is as defined above and is especially nitrophenyl, acetoxyphenyl, dihalophenyl, phenyl, aminophenyl, aminodihalophenyl, dimethoxyphenyl, (lower)alkenylhydroxyphenyl, (lower)alkynylhydroxyphenyl, hydrophenyl and di(trifluoromethyl)phenyl; and most particularly Ar is mono- or di-substituted in the ortho positions.

The process can be conducted under varying conditions, the most critical being the temperature at which the acylative step is performed. When lower temperatures in the range of −25 to 25° C. are employed, it is possible to isolate intermediates from the process that are not isolated when the process is conducted at higher temperatures, these intermediates being readily convertible to the desired N-benzoyl derivative by the use of heat and an organic nucleophile such as pyridine.

The process, at temperatures in the range of −25 to 25° C., is usually performed by dissolving or suspending 2′,2′,4,4-O,O,O,O-tetratetrahydropyranylcoumermycin, or 2′,2′,4-O,O,O-tritetrahydropyranylcoumermycin or 2,2′-O,O-ditetrahydropyranylcoumermycin, or mixtures thereof, in a proton accepting solvent (organic nucleophile) usually selected from the group consisting of a pyridine, or (lower)trialkylamine such as trimethylamine, triethylamine, or one of these in combination with an inert solvent, an example of which may be tetrahydrofuran, benzene, toluene, xylene, chloroform, or ether. The mixture is cooled to about 10° C. by an ice-water bath. An excess of an unsubstituted or substituted benzoyl halide or benzoic acid anhydride, or its functional equivalent, preferably in a ratio of two to four moles of acylating agent to one mole of coumermycin tetrahydropyranyl ether, is added with vigorous stirring. Stirring is maintained for several hours following which the solution is concentrated to a syrup by evaporation in vacuo at temperatures below 25° C. The material isolated by this technique is characterized as a bis-imide, having the formula

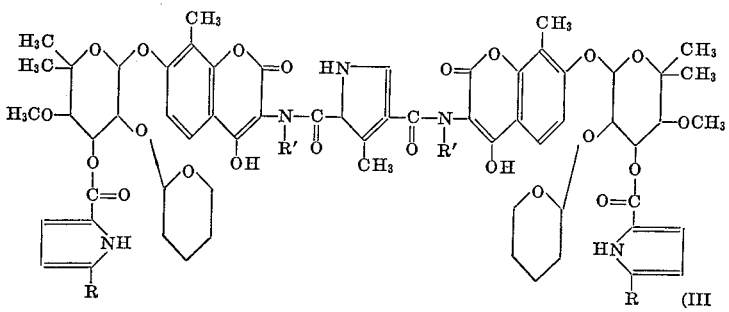

wherein R is hydrogen or methyl and R′ is

Ar being as defined above.

Warming the isolated bis-imide in a water-wet proton accepting organic solvent from the group described above at 50° C. overnight, or by refluxing in said solvent for a minimum time of three hours, results in the formation of compounds having the Formula II.

Mixing the above Compound II in a polar solvent such as a (lower)alkanol, i.e., methanol, ethanol, propanol, etc., in the presence of a catalytic amount of an acid, with or without the aid of heat produces compounds having the Formula I.

An integral part of the instant invention is the inclusion of those compounds directly derived from Formula I above which are defined as those compounds of Formula I wherein Ar is a group having the formula

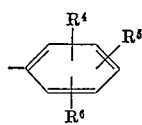

wherein each of R⁴, R⁵ and R⁶ represents hydrogen, fluoro, chloro, bromo, iodo, trifluoromethyl, trichloromethyl, amino, N-(lower)alkylamino, N,N-di(lower)alkylamino, nitro, cyano, (lower)alkyl, (lower)alkenyl, (lower)alkynyl, (lower)alkoxy, hydroxyl, carboxamido, N-(lower)alkyl carboxamido, N,N-di(lower)alkylcarbox- The addition of a suitable acid is necessary to catalyze the cleavage of the tetrahydropyranyl group from Compound II. The acid employed is usually selected from one of the following groups:

(1) Concentrated mineral acids such as sulfuric acid, phosphoric acid, phosphorous acid, and hydrochloric acid.

(2) Arylsulfonic acids having the following formula

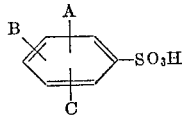

in which each of A, B and C are alike or different and are hydrogen, halogen, (lower)alkyl, (lower)alkoxy, nitro, aryl, or cyano.

(3) Lewis acids such as $SnCl_4$, $AlCl_3$, $BF_3$, $ZnCl_2$, $FeCl_3$.

(4) Acid resins in their acidic form (H+) such as the phenolic sulfonic acids, polystyrene sulfonic acids, polystyrene phosphorous acids, polystyrene phosphonic acids, acrylic carboxylic acids, polystyrene nuclear sulfonic acids, methacrylic carboxylic acid, and in particular macroreticular polystyrene sulfonic acid ("Amberlyst 15"—Rohm and Haas).

(5) Activated carboxylic acids such as $F_3C-CO_2H$, $F_2CHCO_2H$,

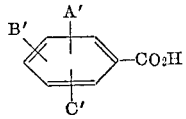

wherein A', B' and C' are alike or different but are nitro, fluoro, cyano or hydrogen.

(6) Alkylsulfonic acids having the formula

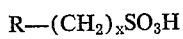

wherein R is selected from the group consisting of aryl, substituted aryl, (lower)alkyl, substituted (lower)alkyl; and where X is a whole integer of 0 to 6 inclusive.

The process, at temperatures above 25° C., and up to the boiling point of the solvent employed, is usually performed by dissolving or suspending 2′,2′,4,4-O,O,O-O-tetratetrahydropyranylcoumermycin, or 2′,2′,4-O,O,O-tritetrahydropyranylcoumermycin, or 2′,2′-O,O-ditetrahydropyranylcoumermycin, or mixtures thereof in a proton accepting solvent (organic nucleophile) usually selected from the group consisting of a pyridine, or (lower) trialkylamine such as trimethylamine, triethylamine; or one of these in combination with an inert solvent, an example of which may be tetrahydrofuran, benzene, toluene, xylene, chloroform or ether.

An excess of an unsubstituted or substituted benzoyl halide or benzoic acid anhydride, or its functional equivalent, preferably in a ratio of two to four moles of acylating agent to one mole of coumermycin tetrahydropyranyl ether, is added to the tetrahydropyranyl ether mixture with vigorous stirring. The resultant mixture is slowly warmed to temperatures up to the boiling point of the solvent employed for a period of time usually in excess of thirty minutes but rarely longer than 40 hours, during which time the solution turns orange to brown in color. The solution is evaporated in vacuo to a syrup and poured into vigorously stirred ice-water. The crystalline product collected is characterized as a mixture consisting of material of Formula II, in addition to lesser quantities of material characterized as having the formulas

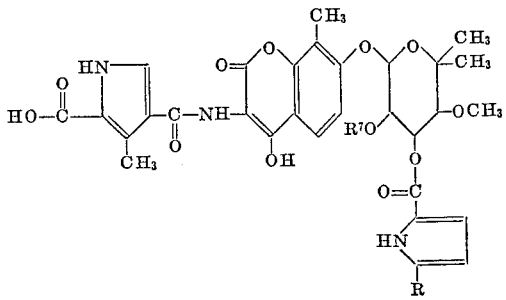

and/or (IV)

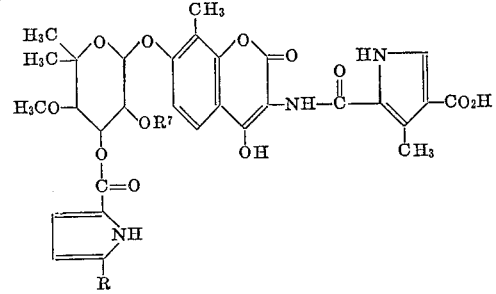

and (V)

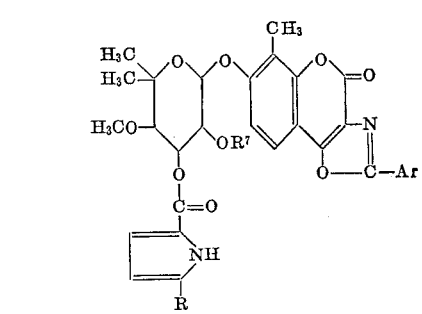

wherein R is hydrogen or methyl, $R^7$ is hydrogen or

and Ar is as defined above.

The mixture is subsequently separated to its component parts by fractional crystallization, chromatography or some other equivalent method. The material of Formula II is then dissolved in a polar solvent such as a (lower) alkanol, i.e., methanol, ethanol, propanol, etc., in the presence of a catalytic amount of an acid from the group described previously, with or without the aid of heat, to produce a compound of Formula I.

While the acylative cleavage proceeds readily by both of the above detailed procedures, it has been observed that the process proceeds most readily with the highest percentage yields of desired product and with the lowest quantity of decomposition products, i.e., oxazole formation and color, when a small quantity of water is added to the mixture of the coumermycin tetrahydropyranyl ether just prior to the addition of the acylating agent. Furthermore, it has been observed that when the ratio of acylating agent to coumermycin tetrahydropyranyl ether is kept below 5:1, the quantity of oxazole, V, formed is kept minimal.

The resultant products of the instant invention described herein have been found to exist in various states of hydration, i.e., anhydrous, monohydrated, and polyhydrated. For the purpose of the disclosure, the invention is considered to embody all such forms as an integral part of same.

The tetrahydropyranyl ethers of coumermycin $A_1$ and $A_2$ described herein do not form part of the present invention. They are the invention of our colleague Donald Edward Nettleton, Jr. and are disclosed and claimed in his application Ser. No. 583,992, filed Oct. 3, 1966, now U.S. Patent No. 3,380,994.

PREPARATION OF THE TETRAHYDROPYRANYL ETHERS OF COUMERMYCIN $A_1$ OR $A_2$

Pure coumermycin $A_1$ or coumermycin $A_2$ is mixed together with excess dihydropyran in the presence of an acid catalyst and an inert solvent to yield mixtures of mono, di, tri and tetra-tetrahydropyranyl ether derivatives of coumermycin $A_1$ or $A_2$ respectively.

More specifically, a coumermycin is mixed together with dihydropyran in various molar proportions, but preferably in a ratio of one mole of coumermycin to more than 20 moles of dihydropyran.

The addition of a suitable acid to the coumermycin-dihydropyran mixture as a catalyst is essential. The acid employed is usually selected from the group consisting of those previously mentioned in the tetrahydropyranyl ether cleavage step.

The quantity of the acid employed as the catalyst is usually determined by the reaction conditions, the bulk of the catalyst and the amount at which the optimum yield of product is obtained.

The reaction may be conducted with or without the use of a cosolvent, the cosolvent usually being employed to increase the solubility of the reactants and reduce the viscosity of the mixture. The cosolvent used is inert and is usually selected from the group consisting of tetrahydrofuran, dioxane, diethyl ether, and dipropyl ethers, the dibutyl ethers, benzene, xylene and toluene.

The reaction is exothermic. It's temperature can be carefully controlled or it can be allowed to seek its own level without substantial differences in the end result. The process is usually conducted at a temperature of 0°–100° C., but preferably in the temperature range of 25° to 60° C. for a period of time dependent upon the temperature used and ultimately upon the completion of reaction and the yields obtained.

As mentioned previously, the process usually results in the formation of mixtures of mono, di, tri and tetra-substituted tetrahydropyranyl ether derivatives of the coumermycins. The ratio of the components of the mixture however, is largely dependent upon the reaction conditions, and most particularly the method of work-up and purification of same.

When the reaction is conducted at elevated temperatures of 60–80° C. for 2 to 4 hours, or at lower temperatures for longer periods of time, under very anhydrous conditions, followed by purification in the absence of polar solvents, there is obtained a product consisting of 80 to 99% pure 2′,2′,4,4-O,O,O,O-tetratetrahydropyranylcoumermycin. The other possible tetrahydropyranylcoumermycins are usually found in the following order of their relative concentration: 2′,2′,4-O,O,O-tritetrahydropyranyl>2′,2′,-O,O-ditetrahydropyranyl>2′,-O-monotetrahydropyranyl>coumermycin.

When the reaction is conducted at lower temperatures, or for shorter periods of time, or under conditions *not* as anhydrous, the proportion of the 2′,2′,4,4-O,O,O,O-tetratetrahydropyranylcoumermycin in the mixture decreases as the proportion of the other tetrahydropyranyl ethers increases.

It is a fact that the tetrahydropyranyl moiety attached to either or both 4-O-positions of the coumermycin molecule is quite labile in the presence of polar solvents. When 2′,2′,4,4 - O,O,O,O - tetratetrahydropyranylcoumermycin or 2′,2′,4-O,O,O-tritetrahydropyranylcoumermycin is crystallized or recrystallized from a hot alcoholic solvent system, the 4-O-tetrahydropyranyl ether functions are cleaved to 4-hydroxyl functions to yield pure 2′,2′,-O,O-dieterahydropyranylcoumermycin. The 2′-O-tetrahydropyranyl ether functions are generally stable when crystallization is carried out in the absence of acidic materials.

Resolution of mixtures of the tetrahydropyranyl ether derivatives can be accomplished by counter-current distribution purification. As a practical matter, the material is suitable as a mixture of di, tri and tetra-tetrahydropyranylcoumermycin, or it can be crystallized from a hot alcoholic solvent system to yield pure 2′,2′-O,O-ditetrahydropyranylcoumermycin, for use as an intermediate in its ultimate conversion to the N-benzoyl cleavage products of the present invention.

The assay used in the examples below is the standard coumermycin $A_1$ assay which is run on Petri plates prepared by using ten ml. of Baltimore Biological Laboratories (BBL) base agar and a top layer of four ml. of BBL seed agar inoculated with *Staph. aureus* ATCC 6538 P. The plates are incubated for 18 hours at 30° C. A standard activity curve for coumermycin $A_1$ is determined by using concentrations in the range of 0.07 to 1.5 μg./ml.

In the instant invention, use of the word coumermycin, without specifically stating coumermycin $A_1$ or $A_2$, shall be taken to mean either coumermycin $A_1$ or $A_2$.

Di, tri, and tetra-tetrahydropyranylcoumermycin $A_1$ mixture and its resolution Coumermycin $A_1$ was stirred with tetrahydrofuran (THF) at room temperature until dissolution occurred. Dihydropyran (DHP) was added followed by Amberlyst 15 (H+) resin (containing less than 0.5% $H_2O$). As stirring continued, additional DHP was added. A gel formed that redissolved after one to two hours. Stirring was continued overnight at room temperature during which time the solution darkened to an orange-brown color.

The Amberlyst resin was removed by filtration and the solution concentrated in vacuo to a syrup. Dilution of the syrup with a minimal quantity of methanol yielded a crude solid (85–95% of theory). The solid was dried in vacuo. Thin layer chromatography indicated the solid consisted of at least three zones ($R_f$ 0.60–0.70) when resolved using 9:21:8 (parts by volume) of methyl acetate: 2-propanol: concentrated $NH_4OH$.

A Craig counter-current distribution separation was run on a 15 g. sample of the mixture using ½ volume upper phase to 1 volume lower phase from a system of 5:1:5:1 of $CCl_4$:$CHCl_3$:$CH_3OH$:$H_2O$ over 1001 transfers, 97.5% of the solid being recovered in total. The recoveries by evaporation and subsequent crystallization from the major concentrations as determined by ultra violet absorption at 345 mμ were as follows:

2′,2′,4,4-O,O,O,O-tetratetrahydropyranyl-coumermycin $A_1$

The tetra-substituted tetrahydropyranyl ether of coumermycin $A_1$ was recovered from tubes 21 through 40 as a pure crystalline solid, 3.68 g., M.P. decomposition above 200° C.

*Analysis.*—Calc'd. for $C_{75}H_{91}N_5O_{24}$: C, 62.27; H, 6.34; N, 4.84. Found: C, 62.03; H, 6.31; N, 4.94.

2′,2′,4-O,O,O-tritetrahydropyranylcoumermycin $A_1$

The tri-substituted tetrahydropyranyl ether of coumermycin $A_1$ was recovered from tubes 41–70 as a pure crystalline solid, 3.8 g., M.P. decomposition above 200° C.

*Analysis.*—Calc'd. for $C_{70}H_{83}N_5O_{23}$: C, 61.71; H, 6.14; N, 5.14. Found: C, 61.65; H, 6.19; N, 5.34.

2′,2′,-O,O-ditetrahydropyranylcoumermycin $A_1$

The di-substituted tetrahydropyranyl ether of coumermycin $A_1$ was recovered from tubes 71–100 as a pure crystalline solid, 1.8 g., M.P. decomposition above 200° C.

*Analysis.*—Calc'd. for $C_{65}H_{75}O_{22}N_5$: C, 61.06; H, 5.91; N, 5.47. Found: C, 61.00; H, 5.83; N, 5.56.

2'-O-monotetrahydropyranylcoumermycin $A_1$

The mono-substituted tetrahydropyranyl ether of coumermycin $A_1$ was recovered from tubes 101–130 as a pure crystalline solid, 1.6 g., M.P. decomposition above 200° C.

*Analysis.*—Calc'd. for $C_{60}H_{65}N_5O_{21}$: C, 60.35; H, 5.66; N, 5.86. Found: C, 60.42; H, 5.81; N, 5.83.

Coumermycin $A_1$ was recovered unreacted from tubes 300–499, 1.5 g., M.P. decomposition 240–245° C.

2',2'-O,O-ditetrahydropyranylcoumermycin $A_1$
(direct method)

Coumermycin $A_1$ (1110.06 g., 1.0 mole) was slurried in a mixture of 11.2 liters of dry THF and 11.2 liters of dry DHP. p-Toluene sulfonic acid monohydrate (2.2 g.) was added and the solution was stirred for twenty hours at room temperature. The solution was concentrated to ⅓ of the volume in vacuo at less than 40° C., filtered and the filtrate poured into 134 liters of dry methanol at 0° C. The product crystallized upon stirring for 30 minutes at 0–5° C. and was collected by filtration. The filter cake was covered by dry solvent at all times while washing same with 10 liters of dry, cold methanol, followed by 5 liters of petroleum ether.

Recrystallization from hot methanol yielded the desired 2',2'-O,O-ditetrahydropyranyl ether.

PREPARATION OF ACYLATING AGENTS

The acylating agents employed in the process of the instant invention were prepared, when not available commercially, from the corresponding benzoic acid derivatives by generally known procedures.

(a) The acid halides were prepared by mixing together the benzoic acid with thionyl halide, with or without the aid of heat, followed by purification by distillation or by crystallization from an inert solvent, i.e., benzene, "Skellysolve B," etc.

(b) The acid anhydrides were prepared by mixing together the benzoic acid with acetic anhydride, with or without the aid of heat, usually followed by purification by crystallization from an inert solvent, i.e., benzene, "Skellysolve B," ethyl acetate, etc.

(c) The mixed acid anhydrides were prepared by mixing together the benzoic acid with ethyl chloroformate in the presence of pyridine with or without the aid of heat, usually followed by "in situ" use on the desired tetrahydropyranylcoumermycin $A_1$ or $A_2$.

These methods work in the preparation of a wide variety of benzoic acid acylating agents as is exemplified in the examples of the instant invention.

The following examples will serve to illustrate but not to limit the present invention. In the *Staphylococcus aureus* plate assays referred to below, the standard was pure coumermycin $A_1$ having an assigned potency of 1000 mcg./mg.

Example 1.—N - benzoyl-3-amino-4-hydroxy-8-methyl-7-[3-O-(5 - methyl - 2 - pyrrolylcarbonyl)noviosyloxy] coumarin Sixteen grams (0.0125 mole) of tetrahydropyranylcoumermycin $A_1$ was dissolved in 500 ml. of freshly distilled pyridine. A three molar excess, 4.5 ml., of benzoyl chloride was added dropwise over a ten minute period at 25° C. and the resultant solution was refluxed for five hours and forty minutes during which time the solution darkened to a deep orange-brown color. The solution was stored for 65 hours at 28–30° C. The solvent was removed in vacuo and the resultant syrup was poured onto 2000 ml. of ice water with vigorous stirring. After several hours of stirring, and storage at room temperature for approximately 16 hours, the brown colored amorphous solid was collected by filtration, washed with water, and dried in vacuo to yield 14.7 g. (plate assay: 18–19 µg./mg.) of a neutral precipitate shown to be a mixture of compounds of the Formulas II, IV and V (R=methyl, Ar=phenyl, $R^7$=tetrahydropyranyl) when separated by thin layer chromatography (TLC). The supernatant was acidified to pH 1–2 by the careful addition of 150 ml. 6 N hydrochloric acid with stirring and cooling in a 0–5° C. ice bath. After vacuum filtering, washing with water, and drying; 748 mg. of light wine colored amorphous solids were collected (acid precipitate). The THP blocking group, as in many of the examples herein, was substantially removed during the acid precipitation step. *Staph. aureus* plate assay, 44 µg./mg.

The acid precipitated solids, 748 mg., were extracted with ethyl ether continuously for 10 hours to yield 550 mg. of orange-gold, amorphous, ether soluble solids. These solids were shown by TLC (system described previously), paper chromatography and bioassay (33 µg./mg. versus *Staph. aureus*) to contain the desired benzoyl compound.

After recrystallization from ethyl acetate/"Skellysolve-B" (petroleum solvent B.P. 60–68° C., essentially n-hexane) the resultant solids were collected and shown to be N - benzoyl - 3 - amino-4-hydroxy-8-methyl-7-[3-O-(5 - methyl-2-pyrrolylcarbonyl)noviosyloxy]coumarin by the usual chemical methods.

The purified product is pale yellow and crystalline (plate assay: 52–90 µg./mg.-partial zones), M.P.: tans and softens ~190° C., browns beginning at 210° C., finally decomposes vigorously at 230–35° C. (turns black).

The absence of the THP blocking group was shown by Nuclear Magnetic Resonance (NMR) analysis. Ultra violet (UV) analysis showed maxima at 280 and 304 mµ, and a shoulder at 232 mµ.

Calc'd. for $C_{31}H_{32}O_{10}N_2$: C, 62.83; H, 5.45; N, 4.73. Found: C, 63.49; H, 5.78; N, 4.43. The sodium salt was prepared (Example 35). Calc'd. for $C_{31}H_{31}O_{10}N_2Na$: C, 60.58; H, 5.08; N, 4.56; Na, 3.74. Found: C, 56.52; H, 5.42; N, 4.31; Na, 3.52; $H_2O$, 5.61.

Example 2.—N-(4-methylbenzoyl)-3-amino-4 - hydroxy-8 - methyl-7-[3-O-(5 - methyl - 2 - pyrrolylcarbonyl) noviosyloxy]coumarin Sixteen grams (12.5 millimoles) of tetrahydropyranyl-coumermycin $A_1$ was dissolved in 350 ml. of freshly distilled pyridine at 25° C. with stirring. Five ml. of p-toluyl chloride (38 millimoles, equivalent to a 3.05/1 molar ratio of p-toluyl chloride to THP-coumermycin) was added slowly over a 10 minute period to the stirred reaction solution at 25° C. The mixture was then refluxed at 115° C. for 7¾ hours, and concentrated in vacuo to ⅓ volume of pyridine. The dark orange-brown, syrupy mixture was poured into 2000 ml. ice water with stirring. After stirring in a 0–5° C. ice bath for 2 hours, the light brown amorphous solids were vacuum filtered, washed with water, and vacuum dried to yield 12.8 grams (*Staph. aureus* plate assay: 49–51 µg./mg.). The pH of the supernatant was adjusted to 1–2 by the addition of 200 ml. of 6 N hydrochloric acid with cooling and stirring in an ice bath. After filtering, washing and drying in the usual manner 3.1 grams of fine, wine colored, amorphous solids were recovered (*Staph. aureus* plate assay: 55 µg./mg.).

The acid precipitated solids 3.1 grams, were extracted continuously with ethyl ether for 24 hours to yield 1.86 grams of ether soluble, cream colored, apparently crystalline solids. This material, representing 60 percent of the crude solids, contained most of the bioactivity (*Staph. aureus* plate assay: 47 µg./mg.).

Chromatography of the solid on Whatman No. 1 phosphate buffered papers (pH 9.0) using a $BuOH/H_2O$ system indicated this material to be essentially one major Ehrlich positive (rose) zone at $R_f$=0.77. There were 4–5 other minor zones present.

Recrystallization from ethyl acetate/"Skellysolve-B" yielded the N-(4-methylbenzoyl)-3-amino-4-hydroxy-8-methyl 7-[3-O-(5 - methyl-2-pyrrolylcarbonyl)noviosyloxy]coumarin compound.

Infrared (IR) and NMR spectral data are consistent with this structure. UV (95% ethanol): maxima at 280 and 305.5mμ minimum at 234mμ.

Calc'd for $C_{32}H_{34}O_{10}N_2$: C, 63.36; H, 5.65; N, 4.62. Found: C, 62.86, 62.59; H, 5.76, 5.77, 5.82; N, 4.51.

Example 3.—N-(2-fluorobenzoyl)-3-amino-4 - hydroxy-8-methyl - 7 - [3-O-(5-methyl-2-pyrrolylcarbonyl)noviosyloxy]coumarin A solution of 10.0 g. (7.9 millimole) of tritetrahydropyranylcoumermycin $A_1$ in 200 ml. of freshly-distilled pyridine was treated with 3.24 ml. of 2-fluorobenzoyl chloride (31.6 millimole) by careful addition. The solution was refluxed for 2½ hours. After cooling for ¾ hour, the pyridine was concentrated to ⅓ volume and poured into ice water. The solution was stirred for 1 hour and the precipitate was filtered off. Fractional precipitation of this neutral fraction from ethyl acetate-"Skellysolve B" gave solids which appeared to contain the desired product when chromatographed on thin layer plates. The solids were purified in the Craig liquid/liquid extractor in the solvent system .25 M triethanolamine (adjusted to pH 8.0 with acetic acid) vs. methyl ethyl ketone. After 100 transfers 745 mg. of material was obtained between tubes 60 and 94. The solids were dissolved in 50 ml. of 80% meOH, 20% acetone with 50 mg. p-toluene sulfonic acid and placed on a shaker at 23° C. for 24 hours. The solution was concentrated to a small volume and diluted with water. The resulting precipitate was recrystallized from ethyl acetate-"Skellysolve B" to yield 262 mg. of the title compound, M.P. 148–151° C. (dec.).

Analysis.—Calc'd for $C_{31}H_{31}N_2O_{10}F$: C, 60.97; H, 5.12; N, 4.59. Found: C, 61.28; H, 5.46; N, 3.94.

Example 4.—N - (4 - bromobenzoyl)-3-amino-4-hydroxy-8 - methyl - 7 - [3-O-(5-methyl-2-pyrrolylcarbonyl)noviosyloxy]coumarin A solution of 15.0 g. (11.0 millimoles) of tritetrahydropyranylcoumermycin $A_1$ in 350 ml. of freshly-distilled pyridine was treated with 9.70 g. (44.1 millimoles) of 4-bromobenzoyl chloride. The reaction mixture was protected from the atmosphere and stirred at 25° C. for 129½ hours. The mixture was concentrated in vacuo at 40° C. to 50 ml. of dark orange-brown syrup. It was poured into 1.00 liter of water with vigorous stirring, and the pH was adjusted to 1.5 with 200 ml. of 6 N hydrochloric acid while cooling in ice at 0–5° C. The resulting suspension was stirred at 0° C. for 2.0 hours and the deep red, amorphous solid was filtered off. The total crude product, after thorough drying, was dissolved in a mixture of 90 ml. of acetone, 370 ml. of methanol, and 1.8 ml. of 2,2-dimethoxypropane, and 930 mg. of p-toluenesulfonic acid monohydrate was added. The clear, deep red solution was stirred at 25° for 93 hours and then evaporated to dryness at 40° in vacuo. The residual solid was shaken with 250 ml. of "Skellysolve-B," the solvent was decanted, and the product was air-dried. The solid was washed with 2.5 liters of water and dried in vacuo at 25° C. for 6 hours, crude weight 17.8 g. The desired product was isolated as follows: 10.0 g. of the crude cleavage product was dissolved as far as possible in 500 ml. of chloroform and a small amount of insoluble material was filtered off. The filtrate was diluted successively with 1000 ml. and 1500 ml. portions of "Skellysolve-B" at 25° C. Two red precipitates were obtained which were shown by TLC to consist of a mixture of compounds of Formulas I, III and IV (R is methyl, $R^1$ is 4-bromobenzoyl). The filtrate was diluted with an additional 1500 ml. of "Skellysolve-B," to yield the title compound, as a deep pink solid which was collected by filtration, 259 mg., M.P. 165° dec.

Calc'd for $C_{31}H_{31}N_2O_{10}Br$: C, 55.44; H, 4.66; N, 4.17. Found: C, 55.02; H, 4.65; N, 3.97.

Example 5.—N-(3-chlorobenzoyl - 3 - amino - 4 - hydroxy-8-methyl-7-[3-O-(5-methyl - 2 - pyrrolylcarbonyl)noviosyloxy]coumarin A solution of 10.0 g. (7.9 millimole) of tri-tetra hydropyranylcoumermycin $A_1$ in 200 ml. of freshly-distilled pyridine was treated with 2.2 ml. of 3-chlorobenzoyl chloride (17.4 millimole) by careful addition and stirred at reflux temperature for 1 hour. After cooling for ½ hour, the reaction mixture was concentrated to ⅓ volume and poured into 1.5 liters of ice water. The solution was acidified to pH 1.5 and cooled for ½ hour. Fractional precipitation of the resulting solid from ethyl acetate-"Skellysolve-B" gave 2.4 g. of crude product. Counter double current distribution in the solvent system .25 M triethanolamine (adjusted to pH 8.0 with acetic acid) vs. methyl ethyl ketone (2.3/3.5) for 44 transfers gave 440 mg. of solid title compound between tubes −10 to 10, M.P. 140° C. (dec.).

Analysis.—Calc'd for $C_{31}H_{31}N_2O_{10}Cl$: C, 59.38; H, 4.98; N, 4.48; Cl, 5.66. Found: C, 59.36; H, 5.53; N, 4.38; Cl, 5.46.

Example 6.—N - (3,4,5 - trimethoxybenzoyl)-3-amino-4 hydroxy-8-methyl - 7 - [3-O-(5-methyl-2-pyrrolylcarbonyl)noviosyloxy]coumarin A solution of 12.8 g. (10.0 millimoles) of di-tetrahydropyranylcoumermycin $A_1$ in 100 ml. of pyridine was treated with 4.6 g. (20 millimoles) of 3,4,5-trimethoxybenzoyl chloride in 50 ml. of pyridine. The reaction mixture was protected from the atmosphere and placed in a hot water bath at 50° C. for 19½ hours. The mixture was concentrated in vacuo to 50 ml. and poured into 10 volumes of iced water. With vigorous stirring, the pH was adjusted to pH 5.0 with 6 N HCl. After stirring for 1 hour, the amorphous solids were filtered off.

After thorough drying, the crude solid (14.5 g.) was suspended in 260 ml. of methanol to which was added 3.6 g. of p-toluenesulfonic acid monohydrate. This suspension was stirred for 24 hours, protected from the atmosphere, at room temperature. The methanol was flashed off, the solids poured into water, then collected by filtration. The solids were thoroughly dried. 11.1 g. of these solids were slurried with 370 ml. of hot ethyl acetate and the insolubles removed by filtration. "Skellysolve-B" was added to the hot ethyl acetate solution until the cloud point was reached and the mixture was cooled in an ice bath and the resultant solids collected by filtration.

This procedure was repeated until the addition of "Skellysolve-B" resulted in no further precipitation.

At this point the ethyl acetate-"Skellysolve-B" mixture was concentrated in vacuo to yield the title compound, 463 mg., M.P. 126° C. (dec.). The last fractional precipitate, 1.18 g., was slightly less pure than the fraction obtained by concentration of the mother liquor.

Analysis.—Calc'd for $C_{34}H_{38}N_2O_{13} \cdot \frac{1}{2}H_2O$: C, 59.04; H, 5.68; N, 4.05; $H_2O$, 1.30. Found: C, 58.85; H, 5.77; N, 4.00.

Example 7.—N - (4 - iodobenzoyl)-3-amino-4-hydroxy-8 - methyl - 7 - [3-O-(5-methyl-2-pyrrolylcarbonyl)noviosyloxy]coumarin A solution of 15.0 g. (11.0 millimole) of tri-tetrahydropyranylcoumermycin $A_1$ in 350 ml. of freshly-distilled pyridine was treated with 11.73 g. (44.0 millimoles) of p-iodobenzoyl chloride and stirred at 25° C. for 74 hours. The dark, orange-brown solution was concentrated in vacuo at 40° C. to ca. 50 ml. and poured into 1.00 liter of ice water with vigorous stirring. The pH was adjusted to ca. 1.5 with 250 ml. of 6 N hydrochloric acid. The suspension was stirred at 0° C. for 1 hour and filtered. The rose-colored solid was washed with four 100 ml. portions of water and dried in vacuo at 25° C. for 24 hours. The total solid was dissolved in a mixture of 560 ml. of acetone, 110 ml. of methanol, and 50 ml. of 2,2-dimethoxypropane and treated with 200 mg. of p-toluenesulfonic acid monohydrate. After stirring at 25° C. for 66.5 hours and recovery of product in the usual manner, the infrared spectrum indicated incomplete cleavage of the tetrahydropyranyl blocking groups. The solid, 14.7 g., was therefore dissolved in a mixture of 70 ml. of acetone, 295 ml. of methanol, 1.5 ml. of 2,2-dimethoxypropane, and stirred with 735 mg. of p-toluenesulfonic acid monohydrate for 27 hours. The solvents were removed in vacuo at 40° and the residue was washed by decantation with 250 ml. of "Skellysolve-B." Thorough washing with 2.5 liters of water followed by vacuum drying left 13.2 g. of red-purple solid. The desired product was isolated by dissolving this solid in 250 ml. of chloroform and adding successively 100 ml. and 200 ml. of chloroform and adding successively 100 ml. and 200 ml. of "Skellysolve-B." The dark red precipitates at each stage were filtered off and found (TLC) to be mixtures. Dilution of the final filtrate with 200 ml. of "Skellysolve-B" yielded 319 mg. of deep pink title compound, M.P. 125° C. dec.

Example 8.—N - (4 - fluorobenzoyl) - 3 - amino-4-hydroxy - 8 - methyl-7-[3-O-(5-methyl-2-pyrrolycarbonyl) noviosyloxy]coumarin A solution of 11.04 g. (8.16 millimole) of tritetrahydropyranylcoumermycin $A_1$ in 300 ml. of freshly-distilled pyridine was treated with 5.13 g. (32.4 millimole) of p-fluorobenzoyl chloride by careful addition with efficient stirring at 25°. The reaction mixture was protected from the atmosphere and stirred at 25° for 77 hours. The color changed from a light yellow to deep scarlet during this time. The reaction mixture was concentrated to ⅓ volume in vacuo at 40° C. and stored at 4° C. for 16 hours. It was poured into 1000 ml. of ice water with vigorous stirring and acidified to pH 1.5 with 250 ml. of 6 N hydrochloric acid. The mixture was stirred at 0–5° C. for 2 hours and the resulting rose-colored solid was separated by filtration and washed with five 100 ml. portions of water. Thorough drying in vacuo gave 13.6 g. of amorphous solid which assayed for coumermycin $A_1$ at 0.05 μg./mg. The THP blocking groups were removed by treating a solution of 13.55 g. of the crude product in a solvent consisting of 65 ml. of acetone, 270 ml. of methanol, and 1.3 ml. of 2,2-dimethoxypropane, with 680 mg. of p-toluenesulfonic acid monohydrate. The clear solution was stirred at 25° C. for 91 hours, then concentrated to dryness at 40° C. The gummy solid was washed with a total of 2.5 liters of water, which converted it to a filterable, red solid which was dried in vacuo over sodium hydroxide pellets, 12.4 g. The infrared spectrum showed the absence of typical THP absorptions near 2900 cm.$^{-1}$, and also showed a very weak amide II band near 1530 cm.$^{-1}$. It was interpreted as indicating that the product was a mixture of the desired amide and the corresponding N,N-bis-p-fluorobenzoylimide (III). The product was isolated by fractional precipitation as follows: The 12.4 g. of cleavage product was heated briefly at reflux with 250 ml. of chloroform, cooled, and an insoluble solid was filtered off. The filtrate was diluted successively with 250 ml., 300 ml., and 500 ml. portions of "Skellysolve-B," at 25° C. The precipitates obtained showed a steady decrease in color from deep red to light pink, and their physical properties indicated that the later precipitates contained increasing proportions of the desired amide. The pure title compound was finally obtained by dilution of the last filtrate with 1250 ml. of "Skellysolve-B," yielding 443 mg. of very light pink, amorphous powder. An additional 3 ml. of the same material was recovered from the filtrate on prolonged standing. The title compound does not melt sharply, but decomposes above 110° C.

Analysis.—Calc'd for $C_{31}H_{31}N_2O_{10}F$: C, 60.97; H, 5.12; N, 4.59. Found: C, 60.38; H, 5.15; N, 4.13.

Example 9.—N - (3,4 - dichlorobenzoyl) - 3 - amino-4-hydroxy-8-methyl - 7-[3-O-(5-methyl-2-pyrrolylcarbonyl) noviosyloxy]coumarin A solution of 12.8 g. (10 millimoles) of di-tetrahydropyranylcoumermycin $A_1$ in 100 ml. of pyridine was refluxed for 1 hour with 3.5 ml. (20 millimoles) of 3,4-dichlorobenzoyl chloride in 50 ml. of pyridine. The reaction mixture turned dark brown on refluxing. It was cooled, concentrated in vacuo to ⅓ its original volume and precipitated with 10 volumes of iced water at pH of 1.5 with 6 N HCl.

The thoroughly dried crude solids were fractionally precipitated from hot ethyl acetate with "Skellysolve-B." Solids were collected by cooling in an ice bath and filtering. Nine solids were collected in this manner with solids 7 and 8 shown to be pure desired derivative (1.4 g.) with a small amount of THP still present.

Of these solids, 1.12 g. were dissolved in 22.4 ml. of methanol, p-toluenesulfonic acid monohydrate (280 mg.) was added and the mixture was stirred for 24 hours at room temperature. Removal of solvent left solids which were then dissolved in THF and slurried with 10% Darco G-60 (activated charcoal) for ½ hour. Carbon was removed by filtration and the filtrate concentrated in vacuo and precipitated with iced water.

The solids were thoroughly dried, dissolved in hot ethyl acetate and precipitated with "Skellysolve-B." A second crop was obtained by the addition of more "Skellysolve-B."

This second crop, 592 mg., was seen to be the desired product, M.P. 159° C. (dec.).

Analysis.—Calc'd for $C_{31}H_{30}N_2O_{10}Cl_2 \cdot H_2O$: C, 54.79; H, 4.75; N, 4.12; Cl, 10.58; $H_2O$, 2.65. Found: C, 54.49; H, 4.84; N, 4.23; Cl, 11.80; $H_2O$, 3.54.

Example 10.—N - (3-methylbenzoyl)-3-amino-4-hydroxy-8 - methyl - 7 - [ 3 - O - (5-methyl-2-pyrrolylcarbonyl) noviosyloxy]coumarin A solution of 10.0 g. of di-tetrahydropyranylcoumermycin $A_1$ in 200 ml. of freshly-distilled pyridine was treated with 4.83 ml. (5.46 g., 35.3 millimoles) of m-toluyl chloride which was added dropwise with good stirring during several minutes at 25° C. The reaction mixture was stirred at 25° C. for 72 hours. It was concentrated to ca. ⅓ volume in vacuo at 40° C. and poured into 1500 ml. of ice water. A precipitate formed immediately and the pH was adjusted to ca. 1.5 with 210 ml. of 6 N hydrochloric acid. Stirring and cooling were continued for 30 minutes, and the precipitate was filtered off to yield 11.5 g. of solid that was then treated in the THP cleavage step as described in Examples 3 and 6. Of the crude product recovered, 10.0 g. was dissolved in 500 ml. of ethyl acetate and 10 ml. of tetrahydrofuran. An insoluble solid, 162 mg., was filtered off and discarded. The filtrate was extracted with two 200 ml. and seven 50 ml. portions of 3% aqueous sodium bicarbonate solution. The organic phase was dried for 1 hour over sodium sulfate and evaporated to dryness in vacuo, leaving 7.55 g. of impure product. It was dissolved as far as possible in ca. 150 ml. of chloroform and an insoluble solid, which weighed 1.10 g., was filtered off and discarded. The filtrate was extracted with five 100 ml. portions of 5% aqueous sodium bicarbonate. The chloroform layer was dried over sodium sulfate and evaporated to dryness in vacuo at 50° C., leaving 3.9 g. of material which was still a mixture (TLC). The 3.9 g. was dissolved in 50 ml. of chloroform and "Skellysolve-B" was added to moderate turbidity at 25° C., precipitating 620 mg. of a mixed solid. The filtrate therefrom was again treated with "Skellysolve-B" to turbidity at 25° C., and another 433 mg. of nearly pure title compound was removed. Repetition of the procedure a third time with a large excess of "Skellysolve-B" produced 1.35 g. of pure product, M.P. 195° dec.

Analysis.—Calc'd for $C_{32}H_{34}N_2O_{10}$: C, 63.36; H, 5.65; N, 4.62. Found: C, 63.42; H, 5.65; N, 4.44.

Example 11.—N - (4 - nitrobenzoyl)-3-amino-4-hydroxy-8 - methyl - 7 - [3 - O - (5-methyl-2-pyrrolylcarbonyl) noviosyloxy]coumarin A solution of 5.0 g. (3.9 mmoles) of tetrahydropyranylcoumermycin $A_1$ in 50 ml. of pyridine containing 141 mg. $H_2O$ (7.8 mmoles) was swirled with 2.90 g. p-nitrobenzoyl chloride (15.6 mmoles) until solution was complete. After stoppering, the flask was placed in a 50° C. water bath and allowed to stand 16 hours. The resulting dark brown solution was poured in 200 ml. of a mixture of ice and water, the pH adjusted to 5.1 with conc. HCl, and then stirred for one hour. The precipitate was recovered by filtering, washed well with water and air dried to yield 5.77 g. of amorphous product. To a 5.67 g. portion of these solids dissolved in 40 ml. acetone and 160 ml. of methanol was added 1.2 g. p-toluenesulfonic acid. The flask was covered and allowed to stand 16 hours at 25° C. The solution was then concentrated in vacuo to one-third volume and the slight precipitate which formed was removed by centrifuging. The mother liquor was then poured into 200 ml. of an ice and water mixture, stirred for one half hour, and the precipitate which formed was recovered by filtering. A 4.21 g. yield of amorphous product was obtained.

A 4.11 g. portion of this material was dissolved in 150 ml. ethyl acetate with boiling. An approximately 30 mg. fraction of dark colored insoluble residue was removed by centrifuging and discarded. To the boiling ethyl acetate solution "Skellysolve-B" was added until it became hazy. After cooling in an ice bath for one-half hour the mixture was filtered and the recovered solids were air dried. A total of 1.70 g. was obtained in four fractions in this manner. The mother liquor was then concentrated to a volume of 50 ml. in vacuo and two more fractions were obtained by precipitating from hot solution with "Skellysolve-B." The two fractions totalled 1.75 g. and yielded assay values of 50 μg./mg. A 1.65 g. portion of the material was dissolved in a mixture of 3 ml. dimethylformamide (DMF) and 15 ml. isopropanol and then precipitated by pouring slowly into 75 ml. $H_2O$. After filtering and air drying a 1.01 g. yield was obtained. This material was redissolved in 25 ml. boiling ethyl acetate and then treated with a small portion of activated charcoal (Darco KB). After removing the activated charcoal by filtering, the filtrate was again brought to a boil and "Skellysolve-B" added to haziness. After cooling the precipitated solids were recovered by filtering and air dried. In the same manner three more fractions were obtained. The third fraction consisted of 416 mg. of yellow, amorphous title solid which assayed 80 μg./mg.

The IR and NMR spectra of this sample are consistent with the product. A separate sample prepared in a similar manner and shown to be identical to the above by IR and NMR spectra was submitted for elemental analysis.

*Analysis.*—Calc'd for $C_{31}H_{31}O_{12}N_3$: C, 58.40; H, 4.90; N, 6.59. Found: C, 57.60; H, 4.89; N, 6.34.

Example 12.—N - (4-aminobenzoyl)-3-amino-4-hydroxy-8 - methyl - 7-[3-O-(5-methyl-2-pyrrolycarbonyl)noviosyloxy]coumarin A 6.37 g. portion (0.01 mole) of N-(4-nitrobenzoyl)-3 - amino - 4 - hydroxy-8-methyl-7-[3-O-(5-methyl-2-pyrrolylcarbonyl)noviosyloxy]coumarin was dissolved in 200 ml. absolute ethanol. To the solution was then added 637 mg. Pd on carbon (5%) and hydrogenation started on the Parr hydrogenation apparatus at an initial pressure of 50 lb./in.² In the first hour a pressure drop of 22 lb./in.² was observed. The pressure was again raised to its initial value and hydrogenation continued for a total of 17.7 hours. The catalyst was removed by filtering over a small pad of filter aid and washed with a small amount of ethanol. The filtrate was reduced to dryness in vacuo and the slightly gummy solids dissolved in 100 ml. of ethyl acetate. The solution was brought to a boil and with vigorous stirring and 10 ml. of "Skellysolve-B" was added. After cooling for one-half hour the dark brown precipitate which formed was recovered by filtration and was air dried. The subsequent addition of seven 10 ml. portions of "Skellysolve-B" resulted in the recovery of an additional seven fractions of title compound that range in color from dark brown to light cream. The last fraction totalling 747 mg. assayed 89–90 μg./mg.

*Analysis.*—Calc'd for $C_{32}H_{33}O_{10}N_3$: C, 61.28; H, 5.47; N, 6.92. Found: C, 61.53; H, 5.73; N, 7.22.

The IR spectrum is consistent with the title compound. There is no 1350 cm.$^{-1}$ band present indicative of a $NO_4$ group. The NMR spectrum is consistent with the indicated structure.

Example 13.—N - (4 - trifluoromethylbenzoyl)-3-amino-4 - hydroxy - 8 - methyl-7-[3-O-(5-methyl-2-pyrrolylcarbonyl)noviosyloxy]coumarin A solution of 12.8 g. (10 millimoles) of di-tetrahydropyranylcoumermycin $A_1$ in 100 ml. of pyridine was refluxed for 1 hour with 3 ml. (20 millimoles) of 4-trifluoromethylbenzoyl chloride in 50 ml. pyridine.

The reaction mixture, which changed from yellow to red-brown on refluxing, was cooled, concentrated to ⅓ its original volume and precipitated by pouring it into 10 volumes of iced water and adjusted to pH 5.0 with concentrated HCl. Solids were collected by filtration and thoroughly dried (13.8 g.).

12.0 g. of this crude product was suspended in a mixture of 60 ml. of acetone and 240 ml. of methanol and 3 g. of p-toluenesulfonic acid monohydrate were added. The suspension wes stirred for 17 hours. The mixture was concentrated in vacuo to ⅓ its original volume and poured into 10 volumes of iced water. The precipitate was collected by filtration.

The desired product was isolated as follows: 10 g. of above solids were slurried in hot ethyl acetate and insolubles removed by filtration. "Skellysolve-B" was added to the hot ethyl acetate filtrate until the cloud point was reached and then the mixture was cooled in an ice bath and solids collected by filtration. This was repeated until a fifth precipitate was collected in this manner. This fifth precipitate, 1.8 g., M.P. 157° C. (dec.), was seen to be the desired pure title compound by IR, NMR, TLC, and bioautograph.

*Analysis.*—Calc'd for: $C_{32}H_{31}O_{10}N_2F_3$: C, 58.18; H, 4.88; N, 4.24. Found: C, 58.15; H, 5.19; N, 4.28.

Example 14.—N - (4-chlorobenzoyl)-3-amino-4-hydroxy-8 - methyl - 7 - [3 - O-(5-methyl-2-pyrrolylcarbonyl)-noviosyloxy]coumarin p-Chlorobenzoyl chloride, 2.74 g. (15.6 millimole), was carefully added at 25° C. to a solution of 5.00 g. (3.91 millimole) of di-tetrahydropyranylcoumarin $A_1$ in 100 ml. of freshly-distilled pyridine. The clear solution was refluxed (115° C.) for 2.0 hours and poured into 1250 ml. of ice-cold 1.2 N hydrochloric acid. After standing at 4° C. for 15 hours, the tan, amorphous solids were filtered off and washed with four 200 ml. portions of water. It was dried to give 5.92 g. of crude product. Removal of the tetrahydropyranyl moieties was effected by dissolving 5.0 g. of the product in 50 ml. of THF and 170 ml. of methanol, adding 750 mg. of p-toluenesulfonic acid monohydrate, and stirring at 25° for 66 hours. The solution was filtered to remove 512 mg. of dark, amorphous solid (discarded), the filtrate was diluted with 200 ml. of water and concentrated at 40° C. in vacuo to remove most of the methanol and THF. The pale, golden solid which precipitated was filtered off and dried, 3.25 g. Of this material, 3.0 g. was dissolved in 200 ml. of chloroform (warmed gently to dissolve). The solution was cooled to ca. 25° C. and 486 mg. of dark, amorphous solid was filtered off. The filtrate was extracted with five 200 ml. portions of 5% aqueous sodium bicarbonate, which removed (as shown by TLC) p-chlorobenzoic acid, coumermycin $A_1$, and the compound of Formula IV. The chloroform solution was dried over sodium sulfate, filtered, and diluted with two increments of "Skellysolve-B" to produce successively an impure fraction (344 mg.) and the desired title compound, 310 mg. The product melted at 250° C. with decomposition.

*Analysis.*—Calc'd for $C_{31}H_{31}N_2O_{10}Cl$: C, 59.37; H, 4.98; N, 4.46. Found: C, 59.32; H, 5.33; N, 4.58.

Example 15.—N - (4 - methoxybenzoyl)-3-amino-4-hydroxy - 8 - methyl - 7-[3-O-(5-methyl-2-pyrrolylcarbonyl)noviosyloxy]coumarin A solution of 15.0 g. of di-tetrahydropyranylcoumermycin $A_1$ in 300 ml. of pyridine was treated with 11.39 g. (66.3 millimole) of p-anisoyl chloride and the solution was stirred at 25° C. for 20 hours. The reaction mixture was poured into 1500 ml. of ice water and the pH was adjusted to ca. 1.5 with 600 ml. of 6 N hydrochloric acid. It was stirred at 0° for 0.5 hour, vacuum-filtered, weight 20 g., and treated in the THP cleavage step as in Examples 3 and 6. The recovered product was dissolved in 300 ml. of chloroform and filtered to remove a trace of solid. The filtrate was extracted with four 200 ml. and four 100 ml. portions of 5% aqueous sodium bicarbonate to remove the strongly acidic substances. The chloroform solution was concentrated in vacuo to give 6.5 g. of tan solid which was shown by TLC to be a mixture. A part of this mixture, 3.0 g., was dissolved in 125 ml. of chloroform and diluted successively with 50 ml., 50 ml., and 150 ml. of "Skellysolve-B," the precipitated solids being filtered off at each stage. The last addition of "Skellysolve-B" produced 1.13 g. of cream-colored, amorphous title solid which melted with decomposition at 170–175° C.

*Analysis.*—Calc'd for $C_{32}H_{34}N_2O_{11}$: C, 61.74; H, 5.51; N, 4.49. Found: C, 62.22; H, 5.64; N, 3.60.

A similar fractional precipitation of the remaining 3.5 g. of mixed product from 325 ml. of ethyl acetate with a total of 1910 ml. of "Skellysolve-B" yielded 370 mg. of product, M.P. 210° C. dec.

*Analysis.*—Found: C, 61.86; H, 5.59; N, 4.20.

Example 16.—N - (3 - trifluoromethylbenzoyl) - 3 - amino - 4 - hydroxy - 8 - methyl - 7 - [3 - O - (5-methyl-2-pyrrolylcarbonyl)noviosyloxy/coumarin.

A solution of 12.8 g. (10 millimoles) of di-tetrahydropyranylcoumermycin $A_1$ in 100 ml. of pyridine was refluxed for 1 hour with 3 ml. (20 millimoles) of m-trifluoromethylbenzoyl chloride in 50 ml. of pyridine.

The reaction mixture was cooled for 2 hours, concentrated to ca. 50 ml. and precipitated by pouring the concentrate into 10 volumes of iced water and adjusting to pH 5.0 with concentrated HCl. The solids were collected by filtration and thoroughly dried (13.3 g.) and were seen to be crude product.

13.2 g. of this crude product was slurried in hot ethyl acetate, insolubles removed by filtration, and fractional precipitation carried out by adding "Skellysolve-B" to the cloud point, cooling in an ice bath and collecting the precipitate by filtration. Seven precipitates were collected in this manner and the final three were seen to be the desired product with a small amount of THP still present.

These 3 solids were combined (4.18 g.) and dissolved in a mixture of 21 ml. of acetone and 83 ml. of methanol, and 25% (w./w) p-toluenesulfonic acid monohydrate was added. The mixture was stirred for 18 hours at room temperature. The mixture was concentrated to ⅓ its original volume and precipitated by pouring into 10 volumes of iced water. The solids were collected by filtration and thoroughly dried, 4.1 g., M.P. 141° C. (dec.). IR, NMR, bioautograph, and TLC showed this solid to be the desired pure title compound.

*Analysis.*—Calc'd for $C_{32}H_{31}O_{10}N_2F_3 \cdot H_2O$: C, 56.63; H, 4.90; N, 4.13. Found: C, 55.98; H, 4.84; N, 4.00.

Example 17.—N - (2 - trifluoromethylbenzoyl) - 3 - amino - 4 - hydroxy - 8 - methyl - 7 - [3 - O - (5-methyl-2-pyrrolylcarbonyl)noviosyloxy/coumarin.

A solution of 12.8 g. (10.0 millimoles) of di-tetrahydropyranylcoumermycin $A_1$ in 100 ml. of pyridine was refluxed for 1 hour with 3 ml. (20 millimoles) of o-trifluoromethylbenzoyl chloride in 50 ml. of pyridine. The reaction mixture turned from yellow to cherry red on refluxing. It was cooled to room temperature, concentrated in vacuo to ⅓ its original volume and precipitated by pouring the concentrate into 10 volumes of iced water and adjusting to pH 5.0 with 6 N HCl. After stirring the mixture for 1 hour, the solids were collected by filtration, 13.1 g. crude solids.

13 g. of this crude product was stirred for 1 hour at room temperature with a mixture of 65 ml. of acetone and 260 ml. of methanol to which had been added 3.25 g. (25% w./w.) of p-toluenesulfonic acid monohydrate. The methanol was flashed off and a solid precipitated by pouring the concentrate into 10 volumes of iced water.

The thoroughly dried solids (11.7 g.) were slurried in hot ethyl acetate (30 mg./ml.) and insolubles were removed by filtration. "Skellysolve-B" was added to the hot ethyl acetate to the cloud point and the mixture was cooled in an ice bath and solids collected by filtration. After repeating this fractional precipitation procedure 5 times the mother liquor was concentrated in vacuo to yield 1.44 g. of desired title compound, M.P. 153° C. (dec.).

*Analysis.*—Calc'd for $C_{32}H_{31}O_{10}N_2F_3$: C, 58.18; H, 4.88; N, 4.24. Found: C, 58.07; H, 5.03; N, 4.18.

Example 18.—N - (2,5 - dichlorobenzoyl) - 3 - amino - 4 - hydroxy - 8 - methyl - 7 - [3 - O - (5 - methyl - 2-pyrrolylcarbonyl)noviosyloxy/coumarin A solution of 12.8 g. (10.0 millimoles) of di-tetrahydropyranylcoumermycin $A_1$ in 100 ml. of pyridine was refluxed for 1 hour with 3.5 ml. (20 millimoles) of 2,5-dichlorobenzoyl chloride in 50 ml. of pyridine. On refluxing, the reaction mixture turned a deep burgundy red. The reaction mixture was concentrated in vacuo to ⅓ its original volume and precipitated in 10 volumes of iced water adjusted to pH 1.5 with 6 N HCl. Solids were collected by filtration.

The thoroughly dried crude solids were dissolved in hot ethyl acetate and fractional precipitation was carried out by the addition of "Skellysolve-B" to the cloud point, followed by cooling in an ice bath. Solids were then collected by filtration. This was repeated six times and then the mother liquor was concentrated to obtain another solid and then taken to dryness to obtain still another solid.

IR, NMR, bioautograph and bioassays showed that the last fractional precipitate, 2.3 g., and the solids obtained on concentration, 3.5 g., were identical and were the desired product but they still contained THP.

One gram of solids was dissolved in a mixture of 5 ml. of acetone and 20 ml. of methanol and to this was added 10% (w./w.) p-toluenesulfonic acid monohydrate and the mixture allowed to stir 1 hour at room temperature. The product was precipitated by adding iced water and solids, 896 mg., were collected by filtration, M.P. 144° C. (dec.). This was seen by NMR, IR, VPC and bioautograph to be the desired title compound.

*Analysis.*—Calc'd for $C_{31}H_{30}N_2O_{10}Cl_2 \cdot H_2O$: C, 54.79; H, 4.75; N, 4.12; Cl, 10.58, $H_2O$, 2.65. Found: C, 55.74; H, 5.00; N, 4.38; Cl, 10.66; $H_2O$, 1.7.

Example 19.—N - (2,6 - dichlorobenzoyl) - 3 - amino - 4 - hydroxy - 8 - methyl - 7 - [3 - O - (5 - methyl - 2-pyrrolylcarbonyl)noviosyloxy/coumarin A solution of 12.8 g. (10 millimoles) of di-tetrahydropyranylcoumermycin $A_1$ in 100 ml. of pyridine was refluxed for 1 hour with 3.5 ml. (20 millimoles) of 2,6-dichlorobenzoyl chloride in 50 ml. of pyridine. The reaction mixture was concentrated to ⅓ its original volume and was precipitated in 10 volumes of iced water adjusted to pH 1.5 with 6 N HCl.

The thoroughly dried crude gray-green solids (15.9 g.) were slurried in a mixture of 79.6 ml. of acetone and 318.4 ml. of MeOH, to which had been added 10%

(w./w.) p-toluenesulfonic acid monohydrate, for 1 hour at room temperature protected from the atmosphere. Solids were obtained by concentrating the mixture and precipitating with iced water.

This solid (13.8 g.) was then dissolved in hot ethyl acetate and fractional precipitation carried out by adding "Skellysolve-B" to the cloud point, cooling in an ice bath and collecting the solids by filtration. Six solids of increasing purity of desired product were obtained in this manner. The final solid was obtained upon concentration of the fractional precipitation mother liquor. This solid (2.27 g.) was seen to be the purest by NMR, IR, bioautograph, and TLC and to be the desired title compound, M.P. 161° C. (dec.).

*Analysis.*—Calc'd for $C_{31}H_{30}N_2O_{10}Cl_2 \cdot H_2O$: C, 54.79; H, 4.75; N, 4.12; Cl, 10.58. Found: C, 55.80; H, 5.21; N, 4.13; Cl, 9.93.

Prolonged drying in vacuo over phosphorus pentoxide appeared to remove the water of hydration, but did not alter the decomposition point.

*Analysis.*—Calc'd for $C_{31}H_{30}N_2O_{10}Cl_2$: C, 56.28; H, 4.57; N, 4.24; Cl, 10.92. Found: C, 56.38; H, 5.22; N, 4.40; Cl, 11.50.

Example 20.—N-(4-cyanobenzoyl)-3-amino-4-hydroxy-8-methyl - 7-[3-O(5-methyl-2-pyrrolylcarbonyl)noviosyloxy]coumarin Substitution in the procedure of Example 1 for the benzoyl chloride used therein of 4-cyanobenzoyl chloride produces N-(4-cyanobenzoyl)-3-amino-4-hydroxy-8-methyl-7-[3-O-(5-methyl-2-pyrrolylcarbonyl)noviosyloxy]coumarin.

Example 21.—N - (2-dimethylaminobenzoyl)-3-amino-4-hydroxy - 8 - methyl - 7 - [3-O-(5-methyl-2-pyrrolylcarbonyl)noviosyloxy]coumarin Substitution in the procedure of Example 3 for the 2-fluorobenzoyl chloride used therein of 2-dimethylaminobenzoyl chloride hydorchloride produces N-(2-dimethylaminobenzoyl) - 3-amino-4-hydroxy-8-methyl-7-[3-O-(5-methyl-2-pyrrolylcarbonyl)noviosyloxy]coumarin.

Example 22.—N - (2 - thioacetoxybenzoyl) - 3 - amino-4-hydroxy - 8 - methyl - 7 - [3-O-(5-methyl-2-pyrrolylcarbonyl)noviosyloxy]coumarin Substitution in the procedure of Example 3 for the 2-fluorobenzoyl chloride used therein of 2-thioacetoxybenzoyl chloride produces N-(2-thioacetoxybenzoyl)-3-amino - 4-hydroxy-8-methyl-7-[3-O-(5-methyl-2-pyrrolylcarbonyl)noviosyloxy]coumarin.

Example 23.—N - (2 - mercaptobenxoyl) - 3 - amino - 4-hydroxy - 8 - methyl - 7 - [3-O-(5-methyl-2-pyrrolylcarbonyl)noviosyloxy]coumarin Hydrolysis of the N-(2-thioacetoxybenzoyl)-3-amino-4 - hydroxy-8-methyl-7-[3-O-(5-methyl-2-pyrrolylcarbonyl)noviosyloxy]coumarin from Example 22 under mild conditions produces N-(2-mercaptobenzoyl)-3-amino-4-hydroxy - 8 - methyl-7-[3-O-(5-methyl-2-pyrrolylcarbonyl)noviosyloxy]coumarin.

Example 24.—N - (4 - carbomethoxybenzoyl)-3-amino-4-hydroxy - 8 - methyl - 7 - [3-O-(5-methyl-2-pyrrolylcarbonyl)noviosyloxy]coumarin Substitution in the procedure of Example 1 for the benzoyl chloride used therein of 4-carbomethoxybenzoyl chloride produces N-(4-carbomethoxybenzoyl)-3-amino-4 - hydroxy-8-methyl-7-[3-O-(5-methyl-2-pyrrolylcarbonyl)noviosyloxy]coumarin.

Example 25.—N - [3-(N'N'-dimethylcarboxamido)benzoyl] - 3 - amino - 4-hydroxy-8-methyl-7-[3-O-(5-methyl-2-pyrrolylcarbonyl)noviosyloxy]coumarin Substitution in the procedure of Example 1 for the benzoyl chloride used therein of 3-(N,N-dimethylcarboxamido)benzoyl chloride produces N-[3-(N',N'-dimethylcarboxamido)benzoyl] - 3 - amino-4-hydroxy-8-methyl-7-[3 - O-(5-methyl-2-pyrrolylcarbonyl)noviosyloxy]coumarin.

Example 26.—N-(3-benzoyl)-3-amino-4-hydroxy-8-methyl-7-[3-O-(2-pyrrolylcarbonyl)noviosyloxy]coumarin Substitution in the procedure of Example 1 for the di-tetrahydropyranylcoumarmycin $A_1$ used therein of di-tetrahydropyranylcoumermycin $A_2$ produces N - (3 - benzoyl) - 3 - amino-4-hydroxy-8-methyl-7-[3-O-(2-pyrrolylcarbonyl)noviosyloxy]coumarin.

Example 27.—N - (2 - methylthiobenzoyl) - 3 - amino-4-hydroxy - 8 - methyl - 7 - [3-O-(5-methyl-2-pyrrolylcarbonyl)noviosyloxy]coumarin Substitution in the procedure of Example 1 for the benzoyl chloride used therein of 2-methylthiobenzoyl chloride produces N-(2-methylthiobenzoyl)-3-amino-4-hydroxy - 8 - methyl-7-[3-O-(5-methyl-2-pyrrolylcarbonyl)noviososyloxy]coumarin.

Example 28.—N - (2,6-dichloro-4-nitrobenzoyl)-3-amino-4 - hydroxy - 8-methyl-7-[3-O-(5-methyl-2-pyrrolylcarbonyl)noviosyloxy]coumarin Substitution in the procedure of Example 19 for the 2,6-dichlorobenzoyl chloride used therein of 2,6-dichloro-4-nitrobenzoyl chloride produces N-(2,6-dichloro-4-nitrobenzoyl) - 3 - amino-4-hydroxy-8-methyl-7-[3-O-(5-methyl-2-pyrrolylcarbonyl)noviosyloxy]coumarin.

Example 29.—N-(4-amino-2,6-dichlorobenzoyl)-3-amino-4 - hydroxy - 8-methyl-7-[3-O-(5-methyl-2-pyrrolylcarbonyl)noviosyloxy]coumarin Substitution in the procedure of Example 12 for the N-(4 - nitrobenzoyl) - 3-amino-4-hydroxy-8-methyl-7-[3-O-(5-methyl-2-pyrrolylcarbonyl)noviosyloxy]coumarin used therein of N - (2,6 - dichloro-4-nitrobenzoyl)-3-amino-4-hydroxy - 8-methyl-7-[3-O-(5-methyl-2-pyrrolylcarbonyl)-noviosyloxy]coumarin produces N-(4-amino-2,6-dichlorobenzoyl) - 3-amino-4-hydroxy-8-methyl-7-[3-O-(5-methyl-2-pyrrolylcarbonyl)noviosyloxy]coumarin.

Example 30.—N - benzoyl-3-amino-4-hydroxy-8-methyl-7-[3 - O - (5-methyl-2-pyrrolylcarbonyl)noviosyloxy]coumarin (addition of water method)

In a manner substantially the same as that employed in Example 13, the reaction was carried out using 1278 g. of di-tatrahydropyranylcoumermycin $A_1$, 36 ml. of water and 480 ml. of benzoyl chloride in 16,000 ml. of dry pyridine at 50° C. for 22 hours.

It was found that the addition of the water to the reaction mixture resulted in consistently improved yields of high quality product with the elimination of the formation of the troublesome red pigments which were generally found to be a sign of a poor preparation. The addition of water to the reaction mixture in the preparation of the other compounds of the instant invention also improves the yields.

Example 31.—N - benzoyl-3-amino-4-hydroxy-8-methyl-7-[3 - O - (5-methyl-2-pyrrolylcarbonyl)noviosyloxy]coumarin (benzoic acid anhydride method)

Substitution in the procedure of Example 1 for the benzoyl chloride used therein of benzoic acid anhydride produces N-benzoyl-3-amino-4-hydroxy-8-methyl-7-[3-O-(5-methyl-2-pyrrolylcarbonyl)noviosyloxy]courmarin.

Example 32.—N - benzoyl-3-amino-4-hydroxy-8-methyl-7-[3 - O - (5-methyl-2-pyrrolylcarbonyl)noviosyloxy]coumarin (mixed anhydride method)

Substitution in the procedure of Example 1 for the benzoyl chloride used therein of the mixed anhydride prepared from benzoic acid and ethyl chloroformate produces N - benzoyl-3-amino-4-hydroxy-8-methyl-7-[3-O-(5-methyl-2-pyrrolylcarbonyl)noviosyloxy]coumarin.

Example 33.—N - (2,6 - dichlorobenzoyl) - 3 - amino - 4 - hydroxy - 8 - methyl - 7 - [3 - O - (2 - pyrrolylcarbonyl)noviosyloxy]coumarin Substitution in the procedure of Example 19 for the ditetrahydropyranylcoumermycin A₁, used therein of ditetrahydropyranylcoumermycin A₂ produces N-(2,6-dichlorobenzoyl) - 3 - amino - 4 - hydroxy - 8 - methyl - 7 - [3-O-(2-pyrrolylcarbonyl)noviosyloxy]coumarin.

Example 34. — N-(2,6-dimethoxybenzoyl)-3-amino-4-hydroxy - 8 - methyl - 7 - [3 - O - (5 - methyl - 2 - pyrrolylcarbonyl)noviosyloxy]coumarin Substitution in the procedure of Example 6 for the 3,4,5-trimethoxybenzoyl chloride used therein of 2,6-dimethoxybenzoyl chloride produces N-(2,6-dimethoxybenzoyl) - 3 - amino - 4 - hydroxy - 8 - methyl - 7 - [3-O-(5-methyl-2-pyrrolylcarbonyl)noviosyloxy]coumarin.

Example 35.—Sodium salt of N-benzoyl-3-amino-4-hydroxy - 8 - methyl - 7 - [3 - O - (5 - methyl - 2 - pyrrolylcarbonyl)noviosyloxy]coumarin N - benzoyl - 3 - amino - 4 - hydroxy - 8 - methyl - 7 - [3 - O - (5 - methyl - 2 - pyrrolylcarbonyl)noviosyloxy]coumarin (136 g.), obtained from the experiment of Example 30, was dissolved in an acetone-triethylamine mixture to which was added an acetone solution of sodium-2-ethylhexanoate (SEH) containing slightly more than an equivalent amount of SEH to precipitate the desired sodium salt.

When crystallized from a substantially dry system the yield of the title compound was 108.9 g. of fine needles. The product is obtained as platelets when crystallized from a wetter system.

Analysis.—Calc'd for $C_{31}H_{31}O_{10}N_2Na$: C, 60.58; H, 5.08; N, 4.56; Na, 3.74. Found: C, 56.52; H, 5.42; N, 4.31; Na, 3,52; H₂O, 5.61.

The potassium salt may be prepared in a similar manner.

Example 36. — N - (4 - carboxybenzoyl)-3-amino-4-hydroxy - 8 - methyl - 7 - [3 - O - (5 - methyl - 2 - pyrrolylcarbonyl)noviosyloxy]coumarin A solution of di-tetrahydropyranylcoumermycin A₁, 5 g., in 200 ml. freshly distilled pyridine was treated with terephthaloyl chloride, 1.67 g., dissolved in 60 ml. of redistilled tetrahydrofuran with stirring. The acid chloride dissolved at room temperature after a short time and the reaction was allowed to proceed for seven days. The solution was concentrated in vacuo at 50° C. to one-third the volume, then poured into cold water, acidified to pH 1.5 with 6 N HCl and filtered after stirring for 30 minutes.

The precipitate was dissolved in warm acetone, filtered and dried (3.57 g.). The residue was dissolved in acetone-methanol and treated with p-toluenesulfonic acid to remove any remaining THP protecting moieties. The crude product was isolated from aqueous acid and purified by counter-current distribution using 100 transfers with a system of methanol:benzene:"Skellysolve-B":water (4:3:2:1).

UV absorption at 280 mµ and a bacterial plate assay indicated two product peaks, one near the origin and one between tubes 30 to 40. The latter yielded 270 mg. of title compound as a crystalline solid which was homogeneous on TLC assay; neutral equivalent of 354, UV peaks at 277, 234 with a shoulder at 308 mµ (in methanol).

Example 37. — N-(3-hydroxy-4-methylbenzoyl)-3-amino - 4 - hydroxy - 8 - methyl - 7 - [3 - O - (5 - methyl-2-pyrrolylcarbonyl)noviosyloxy]coumarin A solution of 10.0 grams (7.82 mmoles) of di-tetrahydropyranylcoumermycin A₁ and 3.96 grams (5.43 mls., 39.1 mmoles) of triethylamine in 100 mls. tetrahydrofuran was refluxed with 6.65 grams (31.28 mmoles) of 3-acetoxy-4-methylbenzoyl chloride for 7 hours. The reaction mixture was precipitated in 800 ml. of "Skellysolve-B." (Yield: 13.4 grams.)

The thoroughly dried crude solids (13.0 grams) were slurried in a mixture of 300 ml. of methanol and 1.95 grams of p-toluenesulfonic acid (~15%) for 24 hours at room temperature, protected from the atmosphere. Solids were obtained by precipitating with 500 ml. of water. Solid-dried weight—9.0 grams.

Approximately 8.5 grams of the thoroughly dried solids were dissolved in 180 ml. of pyridine and were refluxed for 7 hours. After cooling, the reaction mixture was concentrated to ⅓ volume and was precipitated by addition of 250 ml. of ice water. There was an immediate precipitation of light yellow solid which was vacuum filtered, washed with H₂O and dried (5.4 grams). The resultant filtrate was adjusted to pH 1.5 with 6 N HCl and a solid precipitated. The mixture was vacuum filtered, the solid washed with H₂O and dried (2.14 g.).

1.88 grams of the acid precipitated solid was dissolved in 140 ml. ethyl acetate, and 0.747 gram collected as insoluble material at this point. 0.730 gram of this ethyl acetate insoluble solid was dissolved in 50 ml. hot absolute ethanol and fractional precipitation was carried out by repeatedly adding "Skellysolve-B" to the cloud point and collecting the resultant solids by filtration. The first five fractions resulted in brown, tarry substances. The sixth fraction (338.2 mg.), a solid, was obtained by a super-saturation of the solution with "Skellysolve-B." A second solid was obtained by concentration of the fractional precipitation mother liquor (78.6 mg.), MP 178°–180° C. The infrared spectrum of this last fraction (potassium bromide) was consistent with that expected for the title compound.

Example 38. — N-[3-(3-methyl-2-butenyl)-4-hydroxybenzoyl] - 3 - amino - 4 - hydroxy - 8 - methyl - 7 - [3-O - (5 - methyl - 2 - pyrrolylcarbonyl)noviosyloxy]coumarin A solution of 10.0 g. (7.9 mmoles) of tri-tetrahydropyranylcoumermycin A₁ in 200 ml. of pyridine was treated with 4.85 g. (19.6 mmoles) of 3-(3-methyl-2-butenyl) 4-acetoxybenzoyl chloride by careful addition and stirring at reflux temperatures for 1 hour. After cooling for 10 minutes, the reaction mixture was concentrated to ⅓ of the original volume and poured into 1.5 liters of ice water. The solution was acidified to pH 1.5 and cooled for 1 hour. The resultant solid was partitioned between 500 ml. each of ethyl acetate and aqueous 5% NaHCO₃. The ethyl acetate layer was evaporated to dryness in vacuo, then dissolved in 240 ml. of acetone and 60 ml. of methanol. p-Toluenesulfonic acid (0.5 g.) was added and the mixture agitated for 17–20 hours at 23° C. to remove the THP protecting group. The solution was evaporated to dryness in vacuo. The residue was redissolved in ethyl acetate following which four to eight consecutive fractions of desired 4-acetoxy-3-isopentenyl-benzamido product were precipitated in various states of purity by successive additions of "Skellysolve-B" to the hot ethyl acetate solution. After the collection of about four fractions in this manner, the further fractions collected and the mother liquor residues are predominantly N - [3 - (3 - methyl - 2 - butenyl) - 4 - acetoxybenzoyl] - 3 - amino - 4 - hydroxy -8 - methyl - 7 - [3-O - (5 - methyl - 2 - pyrrolylcarbonyl)noviosyloxy]coumarin.

The 4-acetoxybenzoyl product immediately above was dissolved in 100 ml. of liquid ammonia to remove the 4-acetoxy from the benzoyl group. Following the evaporation of the ammonia at room temperature the dry solid was neutralized with dilute HCl and recrystallized from acetone-water to yield the desired product. N-[3-(3-methyl - 2 - butenyl] - 4 - hydroxybenzoyl]-3-amino-4-hydroxy-8-methyl - 7 - [3-O-(5-methyl-2-pyrrolylcarbonyl)

noviosyloxy]coumarin, 2.25 g., M.P. softens 130° C., melts 137° C., plate assay approximately 500 μg./mg.

*Analysis.*—Calcd for C$_{36}$H$_{40}$N$_2$O$_{11}$·H$_2$O. C, 62.24; H, 6.09; N, 4.03; H$_2$O, 2.59. Found: C, 61.94; H, 5.85; N, 4.42; H$_2$O, 2.22.

Example 39.—N - [3 - (3 - methyl-2-butenyl)-4-acetoxybenzoyl] - 3 - amino - 4 - hydroxy-8-methyl-7-[3-O-(5-methyl-2-pyrrolylcarbonyl)noviosyloxy]coumarin 4-acetoxy-3-(3-methyl-2-butenyl)benzoic acid (2.48 g.) was dissolved in tetrahydrofuran (20 ml.), triethylamine (1.5 ml.) added, and the solution cooled to 0° C. Methyl chloroformate was added with stirring. After stirring for 30 minutes a solution of tri-tetrahydropyranylcoumermycin A$_1$ (3.2 g.) and trimethylamine (0.7 ml.) in tetrahydrofuran (20 ml.) was added. The mixture was allowed to reach room temperature, then poured into ice water, acidified and filtered. The solid product was dissolved in pyridine and kept at 50° C. for two days, re-isolated from water, and subjected to THP cleavage as above in Example 38 to yield N-[3-(3-methyl-2-butenyl)-4-acetoxybenzoyl] - 3 - amino-4-hydroxy-8-methyl-7-[3-O-(5-methyl-2-pyrrolylcarbonyl)noviosyloxy]coumarin.

Example 40.—N - [3 - (3-methyl-1-butynyl)-4-hydroxybenzoyl] - 3 - amino - 4 - hydroxy-8-methyl-7-[3-O-(5-methyl-2-pyrrolylcarbonyl)noviosyloxy]coumarin Substitution in the procedure of Example 38 for the 3 - (3 - methyl-2-butenyl)-4-acetoxybenzoyl chloride used therein of 3-(3-methyl-1-butynyl)-4-acetoxybenzoyl chloride produces N - [3 - (3 - methyl-1-butynyl)-4-hydroxybenzoyl] - 3 - amino - 4 - hydroxy - 8 - methyl-7-[3-O-(5-methyl-2-pyrrolylcarbonyl)noviosyloxy]coumarin.

Example 41.—N-[3-(3-methylbutyl)-4-hydroxybenzoyl]-3 - amino-4-hydroxy-8-methyl-7-[3-O-(5-methyl-2-pyrrolylcarbonyl)noviosyloxy]coumarin Substitution in the procedure of Example 38 for the 3 - (3 - methyl-2-butenyl)-4-acetoxybenzoyl chloride used therein of 3-(3-methylbutyl)-4-acetoxybenzoyl chloride produces N - [3 - (3-methylbutyl)-4-hydroxybenzoyl]-3-amino-4-hydroxy - 8 - methyl - 7 - [3-O-(5-methyl-2-pyrrolylcarbonyl)noviosyloxy]coumarin.

Example 42.—N - [3 - (3-methyl-2-butenyl)-4-methoxybenzoyl]-3-amino - 4 - hydroxy - 8 - methyl-7-[3-O-(5-methyl-2-pyrrolylcarbonyl)noviosyloxy]coumarin A solution of 10.0 g. (7.9 mmoles) of tri-tetrahydropyranylcoumermycin A$_1$ in 200 ml. of pyridine is treated with 4.85 g. (19.6 mmoles) of 3-(3-methyl-2-butenyl)-4-methoxybenzoyl chloride by careful addition and stirring at reflux temperatures for 1 hour. After cooling for 10 minutes, the reaction mixture is concentrated to ⅓ of the original volume and poured into 1.5 liters of ice water. The solution is acidified to pH 1.5 and cooled for 1 hour. The resultant solid is partitioned between 500 ml. each of ethyl acetate and aqueous 5% NaHCO$_3$. The ethyl acetate layer is evaporated to dryness in vacuo, then dissolved in 240 ml. of acetone and 60 ml. of methanol. p-Toluenesulfonic acid (0.5 g.) is added and the mixture agitated for 17-20 hours at 23° C. to remove the THP protecting group. The solution is evaporated to dryness in vacuo. The residue is redissolved in ethyl acetate following which four to eight consecutive fractions of desired 4 - methoxy - 3 - isopentenylbenzamido product and precipitated in various states of purity by successive additions of "Skellysolve-B" to the hot ethyl acetate solution. After the collection of about four fractions in this manner, the further fractions collected and the mother liquor residues are predominantly N - [3 - (3-methyl-2-butenyl)-4-methoxybenzoyl] - 3 - amino-4-hydroxy-8-methyl-7-[3-O-(5-methyl-2-pyrrolylcarbonyl)noviosyloxy]coumarin.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. A compound having the formula

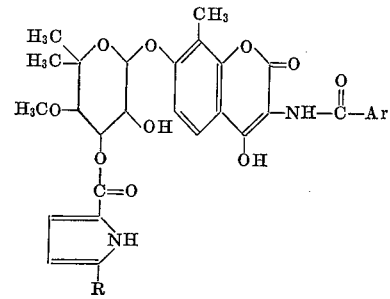

wherein R is either hydrogen or methyl, and Ar is a group having the formula

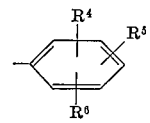

in which each of R$^4$, R$^5$ and R$^6$ represents hydrogen, fluoro, chloro, bromo, iodo, trifluoromethyl, trichloromethyl, amino, N-(lower)alkylamino, N,N-di(lower)alkylamino, nitro, cyano, (lower)alkyl, (lower)alkenyl, (lower)alkynyl, (lower)alkoxy, hydroxy, carboxamido, N-(lower)alkylcarboxamido, N,N-di(lower)alkylcarboxamido, carboxy, carb(lower)alkoxy, acetoxy, mercapto, thioacetoxy or (lower)alkylthio; and the nontoxic, pharmaceutically acceptable cationic salts thereof.

2. A compound of claim 1 having the formula

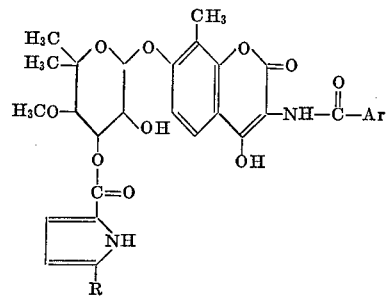

wherein R is either hydrogen or methyl, and Ar is a group having the formula

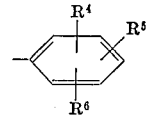

in which each of R$^4$, R$^5$ and R$^6$ represents hydrogen, fluoro, chloro, bromo, iodo, trifluoromethyl, amino, N,N-di(lower)alkylamino, nitro, cyano, (lower)alkyl, (lower)alkenyl, (lower)alkynyl, (lower)alkoxy, hydroxy, carboxy, carb-(lower)alkoxy, acetoxy, mercapto, thioacetoxy or (lower)alkylthio; and the nontoxic, pharmaceutically acceptable cationic salts thereof.

3. A compound of claim 1 having the formula

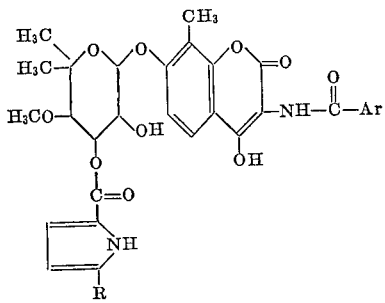

wherein R is either hydrogen or methyl, and Ar is a group having the formula

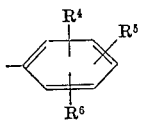

in which each of $R^4$ and $R^5$ represents hydrogen, fluoro, chloro, bromo, iodo, trifluoromethyl, N,N-di(lower)alkylamino, nitro, cyano, (lower)alkyl, (lower)alkenyl, (lower)alkynyl, (lower)alkoxy, N,N-di(lower)alkylcarboxamido, carb(lower)alkoxy, acetoxy, thioacetoxy or (lower)alkylthio; and the nontoxic, pharmaceutically acceptable cationic salts thereof.

4. A compound of claim 1 having the formula

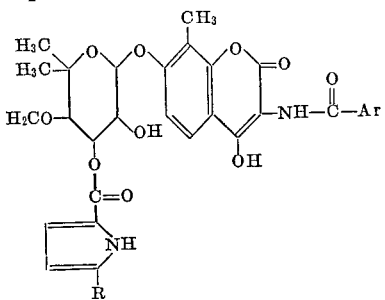

wherein R is either hydrogen or methyl, and Ar is a group having the formula

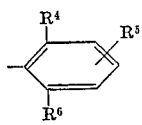

in which $R^4$, $R^5$ and $R^6$ represents hydrogen, fluoro, chloro, bromo, iodo, trifluoromethyl, amino, N,N-di(lower)alkylamino, nitro, cyano, (lower)alkyl, (lower)alkenyl, (lower)alkynyl, (lower)alkoxy, hydroxy, N,N-di(lower)alkylcarboxamido, carboxy, carb(lower)alkoxy, acetoxy, mercapto, thioacetoxy or (lower)alkylthio; and wherein no more than one of the group $R^4$, $R^5$ and $R^6$ shall be hydrogen; and the nontoxic, pharmaceutically acceptable cationic salts thereof.

5. A compound of claim 1 having the formula

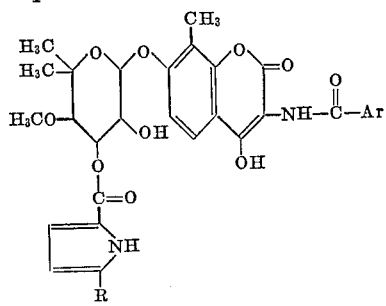

wherein R is either hydrogen or methyl, and Ar is a group having the formula

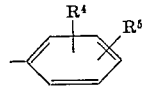

in which each of $R^4$ and $R^5$ represents hydrogen, fluoro, chloro, bromo, iodo, trifluoromethyl, amino, N,N-di(lower)alkylamino, nitro, cyano, (lower)alkyl, (lower)alkenyl, (lower)alkynyl, (lower)alkoxy, hydroxy, N,N-di(lower)alkylcarboxamido, carboxy, carb(lower)alkoxy, acetoxy, mercapto, thioacetoxy or (lower)alkylthio; and the nontoxic, pharmaceutically acceptable cationic salts thereof.

6. A compound of claim 1 having the formula

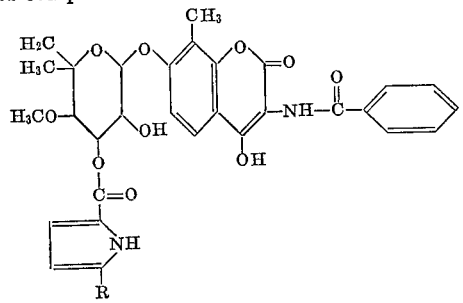

wherein R is either hydrogen or methyl; and nontoxic, pharmaceutically acceptable cationic salts thereof.

7. A compound of claim 1 having the formula

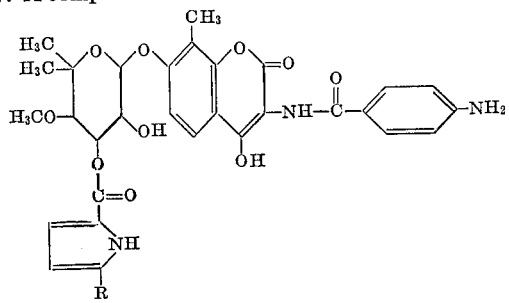

wherein R is hydrogen or methyl; and nontoxic, pharmaceutically acceptable cationic salts thereof.

8. A compound of claim 1 having the formula

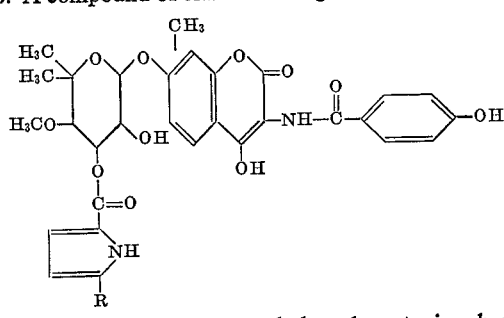

wherein R is hydrogen or methyl; and nontoxic, pharmaceutically acceptable cationic salts thereof.

9. A compound of claim 1 having the formula

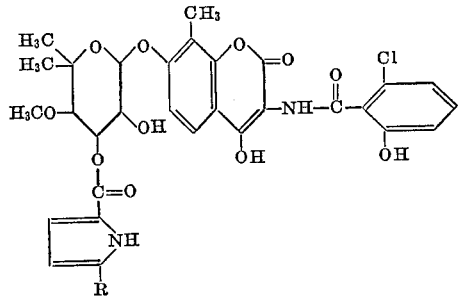

wherein R is either hydrogen or methyl; and nontoxic, pharmaceutically acceptable cationic salts thereof.

10. A compound of claim 1 having the formula

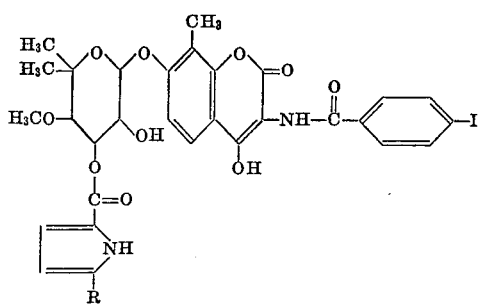

wherein R is either hydrogen or methyl; and nontoxic, pharmaceutically acceptable cationic salts thereof.

11. A compound of claim 1 having the formula

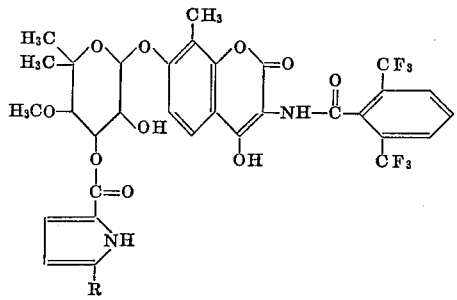

wherein R is either hydrogen or methyl; and nontoxic, pharmaceutically acceptable cationic salts thereof.

12. A compound of claim 1 having the formula

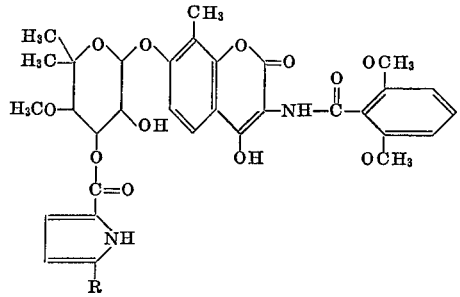

wherein R is either hydrogen or methyl; and nontoxic, pharmaceutically acceptable cationic salts thereof.

13. A compound of claim 1 having the formula

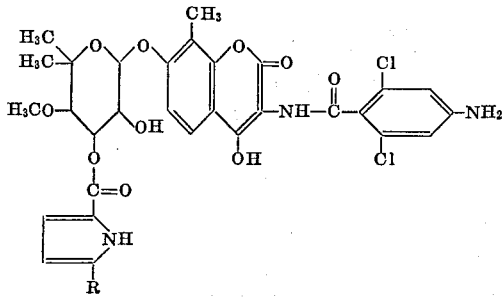

wherein R is either hydrogen or methyl; and nontoxic, pharmaceutically acceptable cationic salts thereof.

14. A compound of claim 1 having the formula

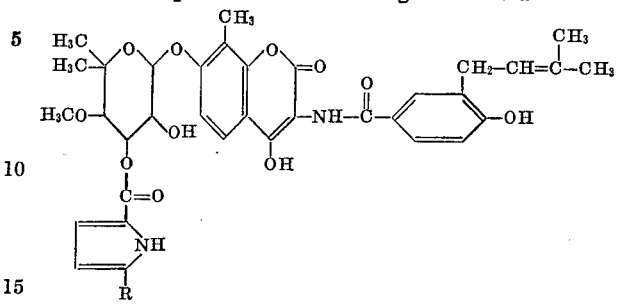

wherein R is either hydrogen or methyl; and nontoxic, pharmaceutically acceptable cationic salts thereof.

15. A compound of claim 1 having the formula

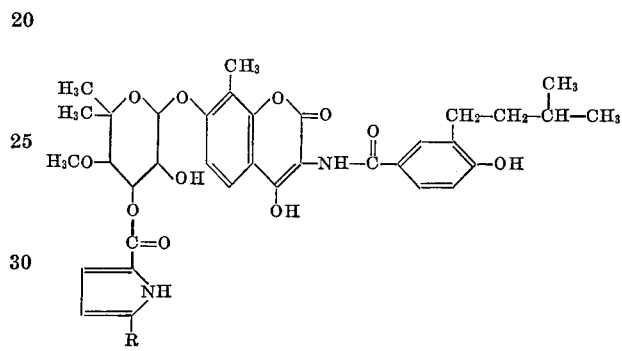

wherein R is either hydrogen or methyl; and nontoxic, pharmaceutically acceptable cationic salts thereof.

16. A compound of claim 1 having the formula

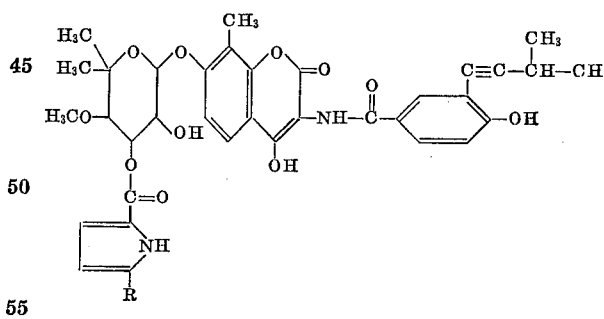

wherein R is either hydrogen or methyl; an nontoxic, pharmaceutically acceptable cationic salts thereof.

17. The process which comprises the consecutive steps of:

(a) mixing together a compound having the formula

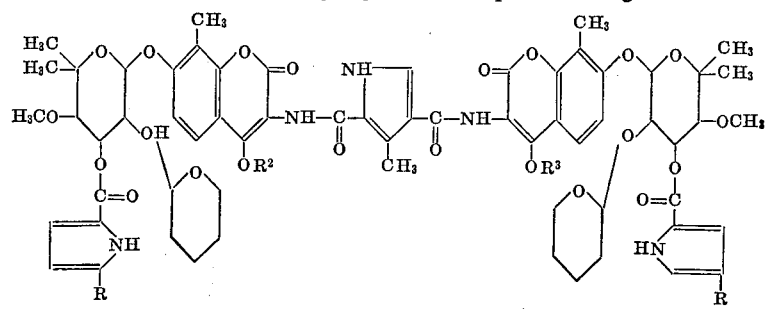

wherein R is hydrogen or methyl, and $R^2$ and $R^3$ are the same or different and are either —H or

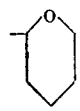

with an acid halide having the formula

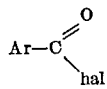

or its functional equivalent as an acylating agent in which Ar is a group having the formula

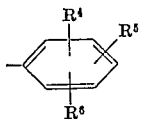

in which $R^4$, $R^5$ and $R^6$ each represent hydrogen, fluoro, chloro, bromo, iodo, trifluoromethyl, trichloromethyl, di(lower)alkylamino, nitor, cyano, actoxy, (lower)alkyl, (lower)alkenyl, (lower)alkynyl, (lower)alkoxy, N,N-di(lower)alkylcarboxamido, thioacetoxy, carb(lower)alkoxy or (lower)alkylthio; to produce a compound having the formula

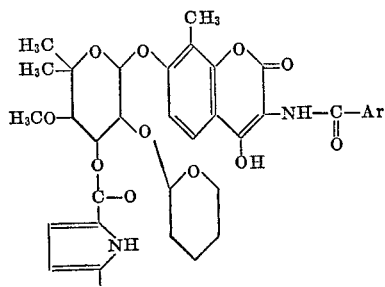

wherein R and Ar are as described above; and
(b) allowing said tetrahydropyranyl ether to stand in a polar solvent in the presence of a catalytic amount of an acid to produce a compound having the formula

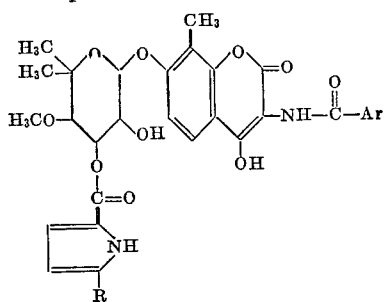

wherein R and Ar are as described above.

18. The process of claim 17 which comprises the consecutive steps of:
(a) mixing together a compound having the formula wherein R is hydrogen or methyl, and $R^2$ and $R^3$ are the same or different and are either —H or

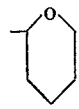

with an acid halide having the formula

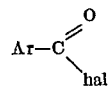

or its functional equivalent, as an acylating agent in which Ar is a group having the formula

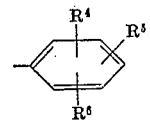

in which $R^4$, $R^5$ and $R^6$ each represent hydrogen, fluoro, chloro, bromo, iodo, trifluoromethyl, trichloromethyl, di(lower)alkylamino, nitro, cyano, (lower)alkyl, (lower)alkenyl, (lower)alkynyl, (lower)alkoxy, acetoxy, or N,N-di(lower)alkylcarboxamido, thioacetoxy, carb(lower)alkoxy or (lower)alkylthio; in a solvent system capable of inactivating protons to produce a compound having the formula

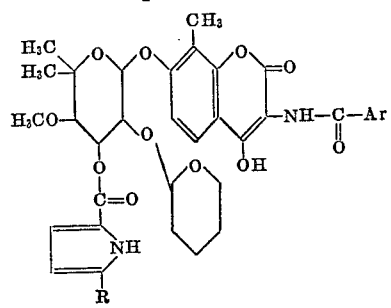

wherein R and Ar are as described above; and
(b) allowing said tetrahydropyranyl ether to stand in a (lower)alkanol in the presence of a catalytic amount of an acid to produce a compound having the formula

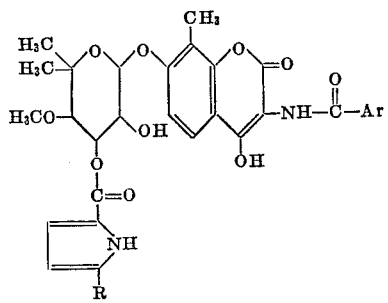

wherein R and Ar are as described above.

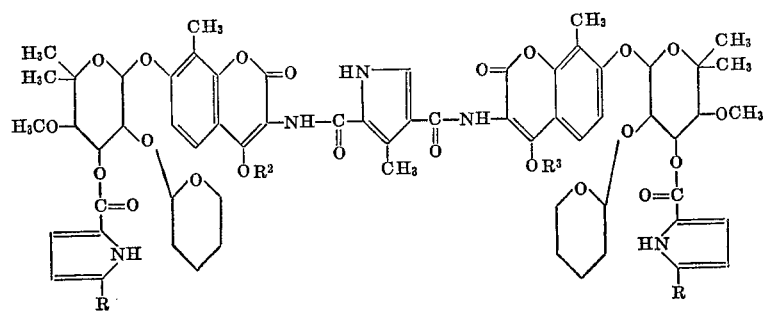

19. The process of claim 17 which comprises the consecutive steps of:

(a) mixing together a compound having the formula

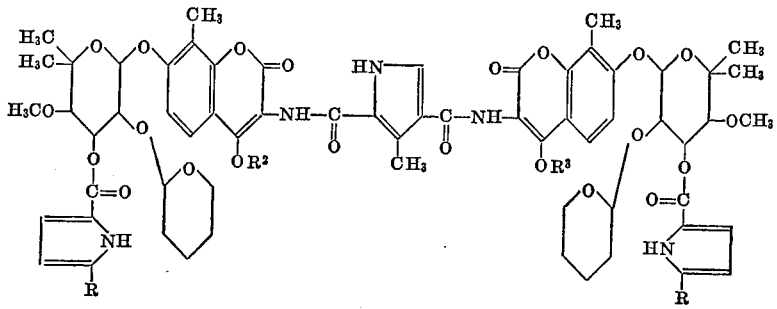

wherein R is hydrogen or methyl, and $R^2$ and $R^3$ are the same or different and are either —H or

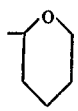

with an acid halide having the formula

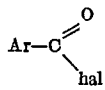

or its functional equivalent, as an acylating agent in which Ar is a group having the formula

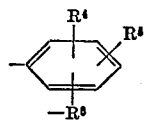

in which $R^4$, $R^5$ and $R^6$ each represent hydrogen, fluoro, chloro, bromo, iodo, trifluoromethyl, trichloromethyl, di(lower)alkylamino, nitro, cyano, (lower)alkyl, (lower)alkenyl, (lower)alkynyl, or (lower)alkoxy, acetoxy, or N,N-di(lower)alkylcarboxamido, thioacetoxy, carb(lower)alkoxy or (lower)alkylthio; in a solvent system capable of inactivating protons which contains a pyridine or tri(lower)alkylamine to produce a compound having the formula

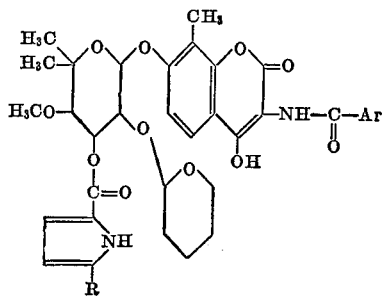

wherein R and Ar are as described above; and (b) allowing said tetrahydropyranyl ether to stand in a (lower)alkanol at a temperature in the range of 0°–100° C. in the presence of a catalytic amount of an acid to produce a compound having the formula

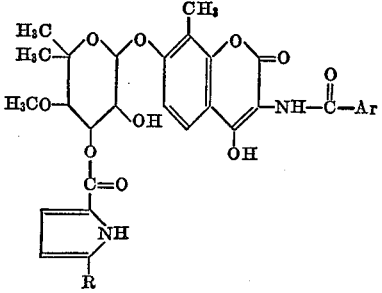

wherein R and Ar are as described above.

References Cited

UNITED STATES PATENTS 3,268,511  8/1966  Kiss et al. _____ 260—210

LEWIS GOTTS, *Primary Examiner.*

JOHNNIE R. BROWN, *Assistant Examiner.*

U.S. Cl. X.R.

195—80; 424—181

UNITED STATES PATENT OFFICE
CERTIFICATE OF CORRECTION

Patent No. 3,428,623                          February 18, 1969

John G. Keil et al.

It is certified that error appears in the above identified patent and that said Letters Patent are hereby corrected as shown below:

Column 32, lines 15 to 26, the left-hand portion of the formula should appear as shown below:

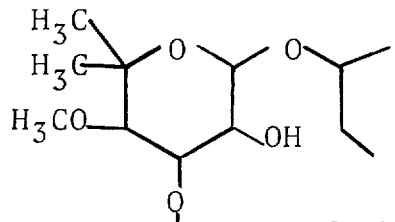

lines 45 to 57, the center portion of the formula should appear as shown below:

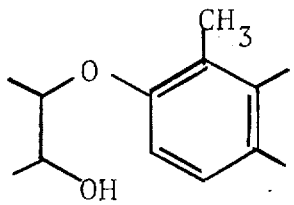

lines 61 to 73, the right-hand portion of the formula should appear as shown below:

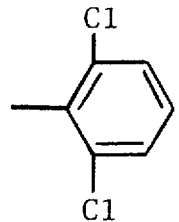

Column 33, lines 35 to 47, the right-hand portion of the formula should appear as shown below:

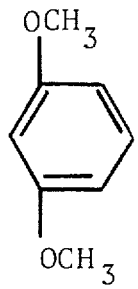

lines 51 to 63, the center portion of the formula should appear as shown below:

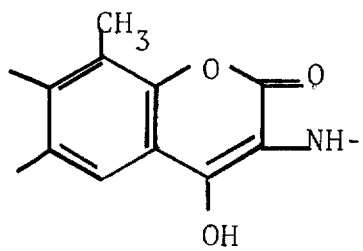

Column 34, claim 17, the formula should appear as shown below:

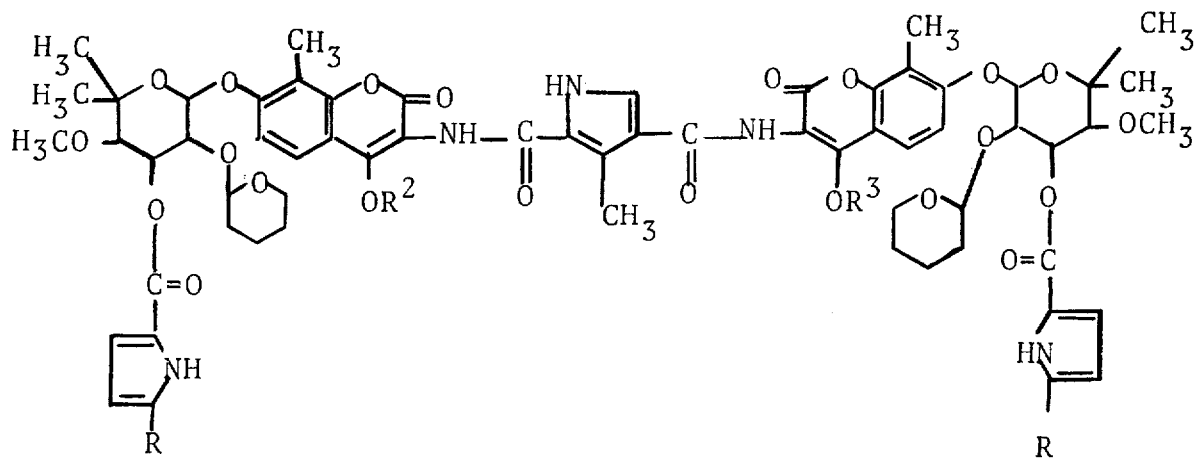

Column 35, between lines 29 and 40, the lower left-hand portion should appear as shown below:

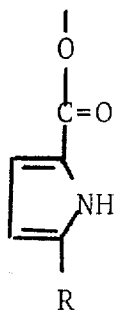

Signed and sealed this 24th day of March 1970.

(SEAL)
Attest:

EDWARD M. FLETCHER, JR.
Attesting Officer

WILLIAM E. SCHUYLER, JR
Commissioner of Patents